Dec. 10, 1957     A. NOVICK     2,815,810
DIE PRESS

Filed May 26, 1951                            23 Sheets-Sheet 1

INVENTOR.
Abraham Novick
BY
Moses, Nolte, Crewst+Berry
ATTORNEYS

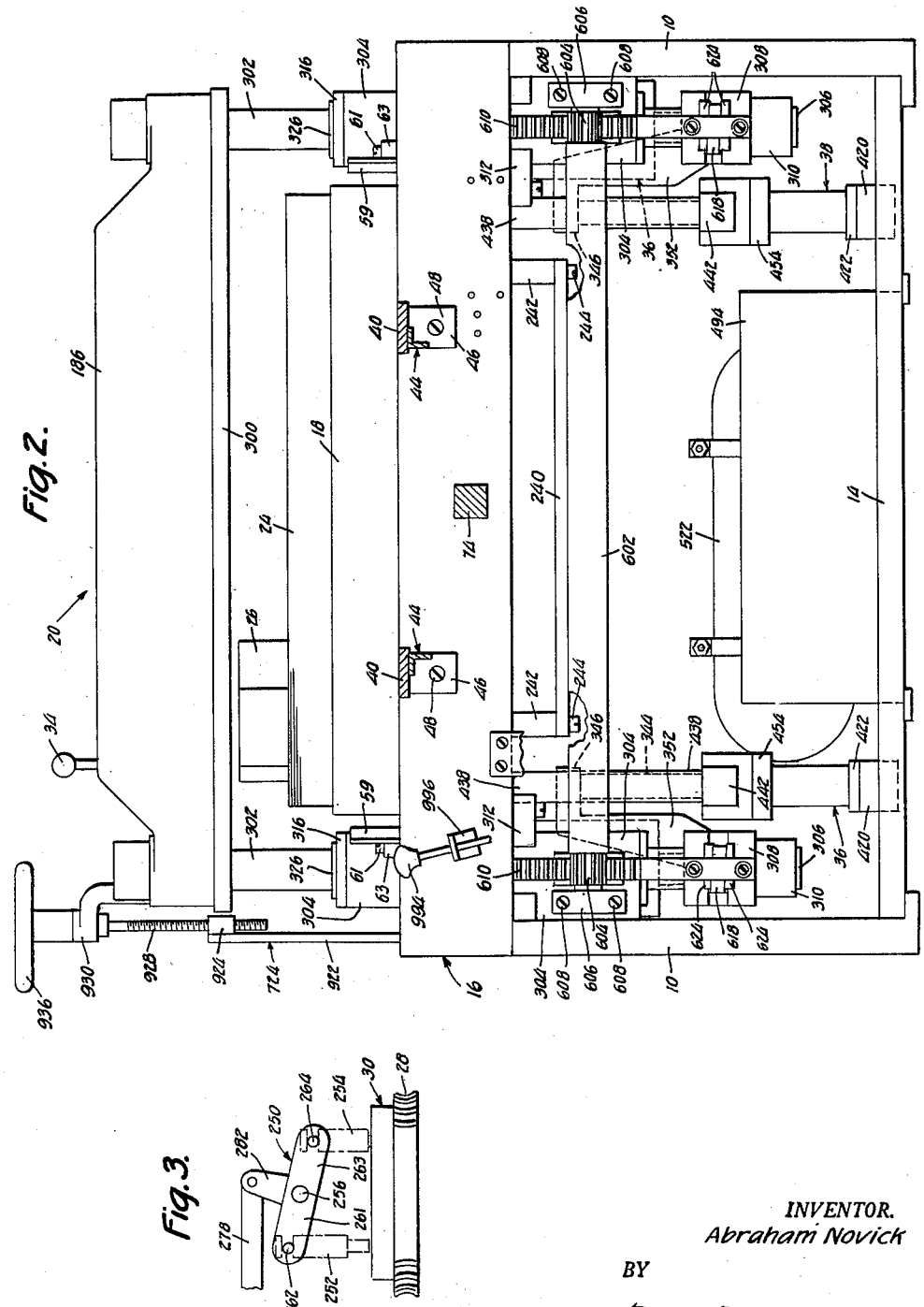

Dec. 10, 1957 A. NOVICK 2,815,810
DIE PRESS
Filed May 26, 1951 23 Sheets-Sheet 4

INVENTOR.
Abraham Novick
BY
Moses, Nolte, Crews + Berry
ATTORNEYS

Dec. 10, 1957

A. NOVICK 2,815,810

DIE PRESS

Filed May 26, 1951

Rear View

INVENTOR.
Abraham Novick

BY

Moses, Nolte, Crews + Berry
ATTORNEYS

Dec. 10, 1957 A. NOVICK 2,815,810
DIE PRESS
Filed May 26, 1951 23 Sheets-Sheet 6

INVENTOR.
Abraham Novick
BY
Moses, Nolte, Crew & Berry
ATTORNEYS

Dec. 10, 1957            A. NOVICK            2,815,810
DIE PRESS
Filed May 26, 1951                          23 Sheets-Sheet 7
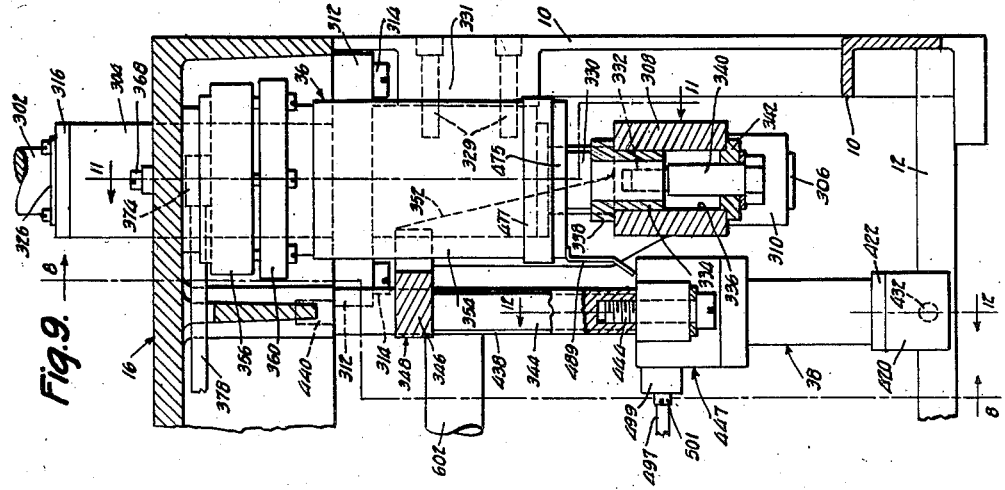
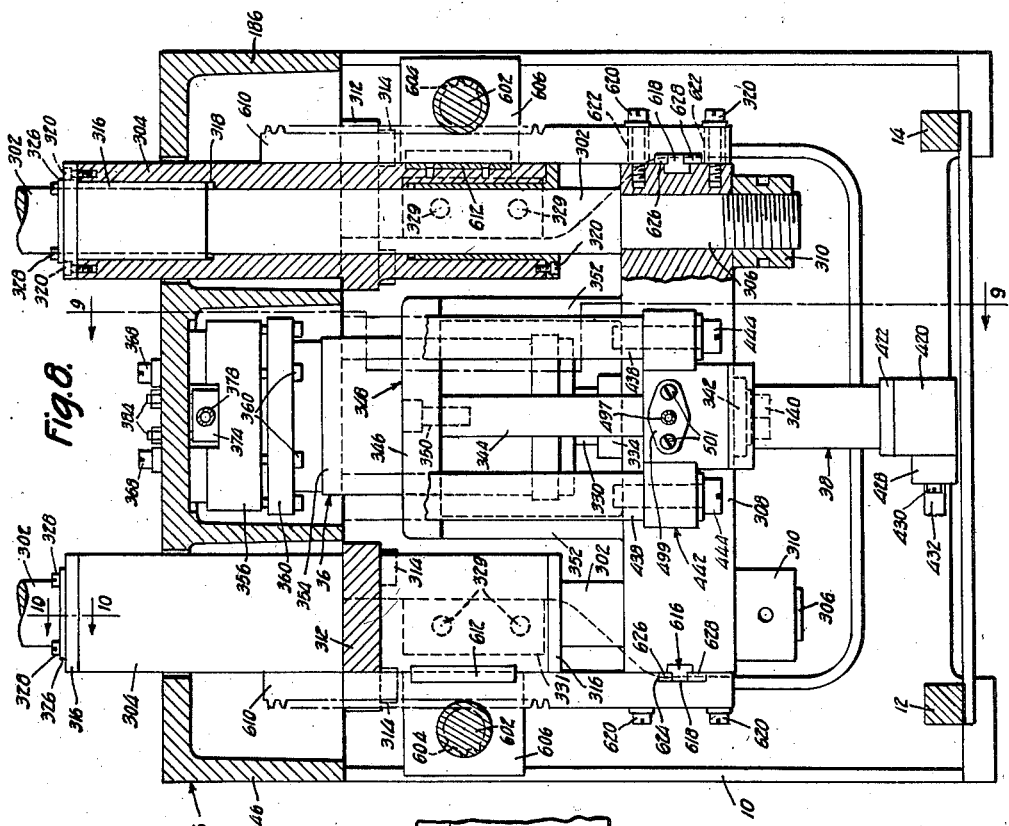
INVENTOR.
Abraham Novack
BY
*Moses, Nolte, Crews + Berry*
ATTORNEYS

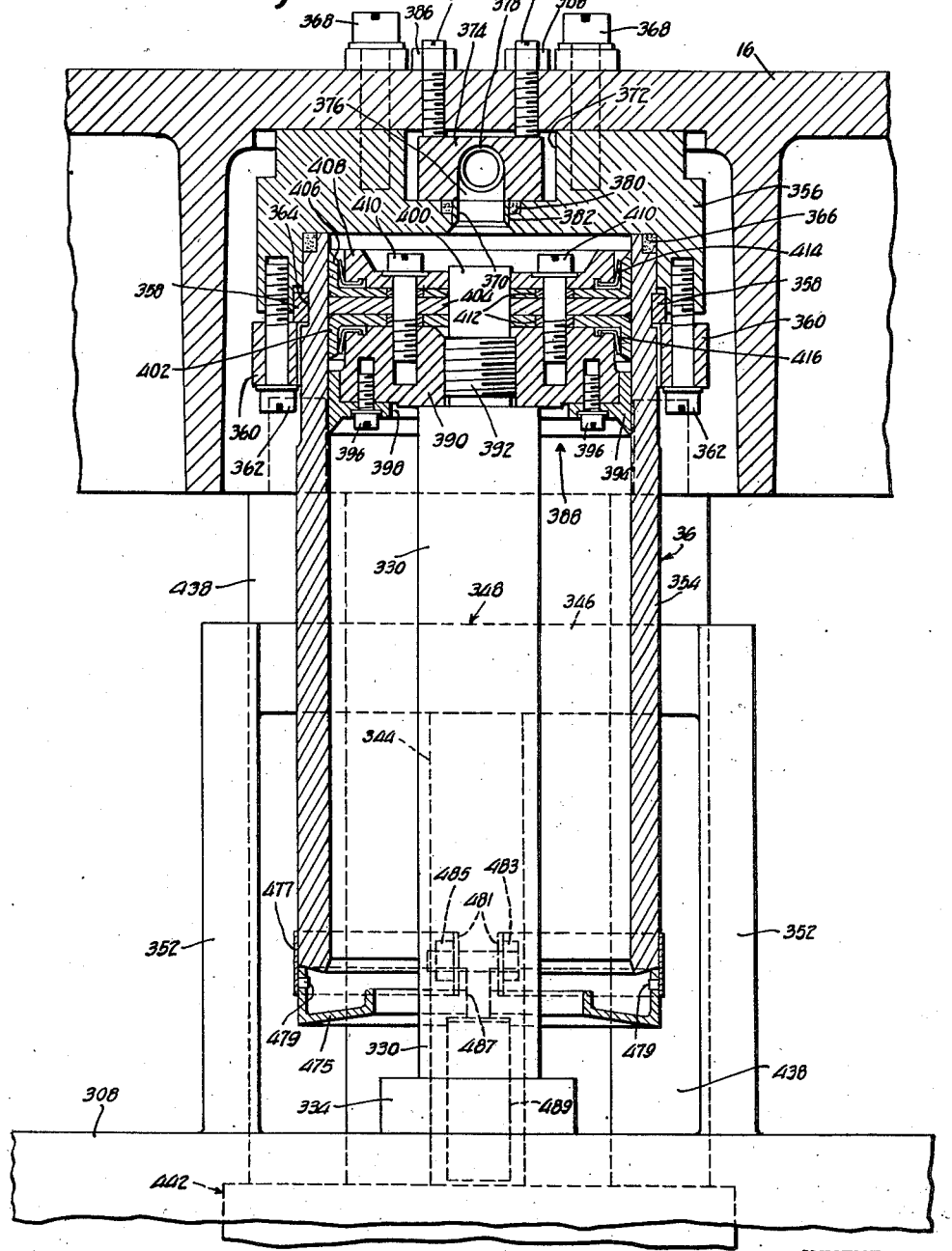

Dec. 10, 1957  A. NOVICK  2,815,810
DIE PRESS
Filed May 26, 1951  23 Sheets-Sheet 9
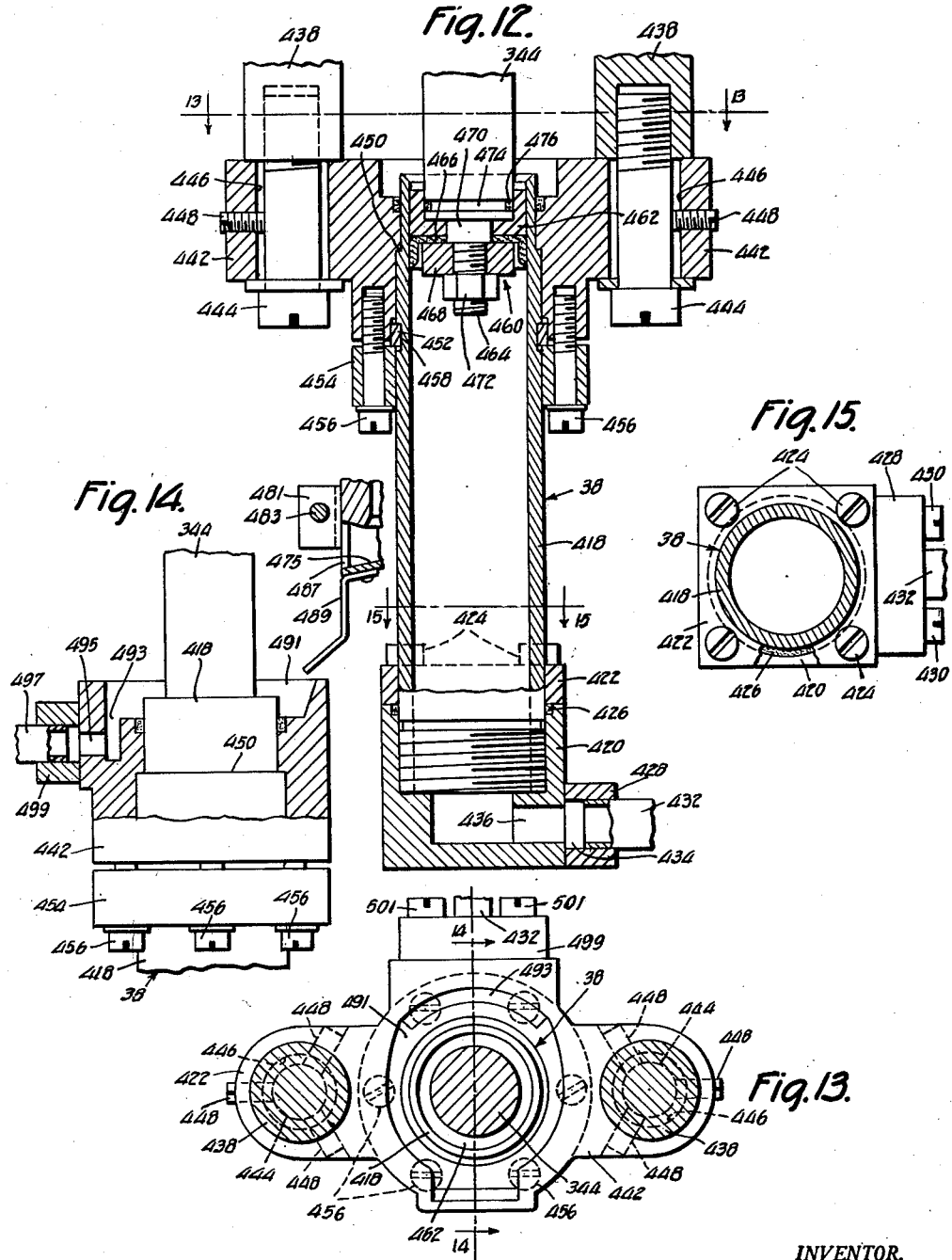
INVENTOR.
Abraham Novick
BY
Moses, Nolte, Crews & Berry
ATTORNEYS

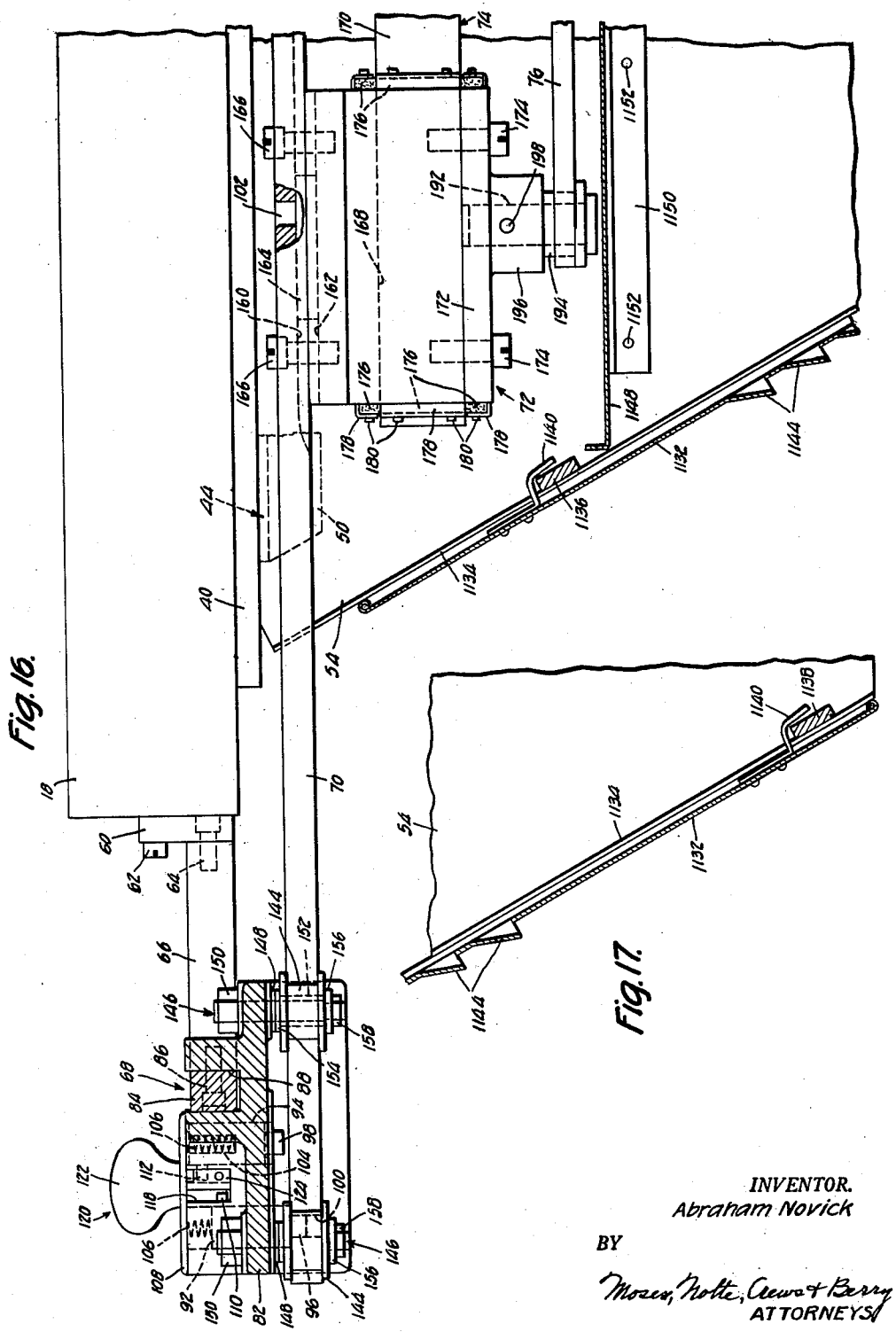

INVENTOR.
Abraham Novick
BY
Moses, Nolte, Cruso & Berry
ATTORNEYS

Dec. 10, 1957    A. NOVICK    2,815,810
DIE PRESS
Filed May 26, 1951    23 Sheets-Sheet 12
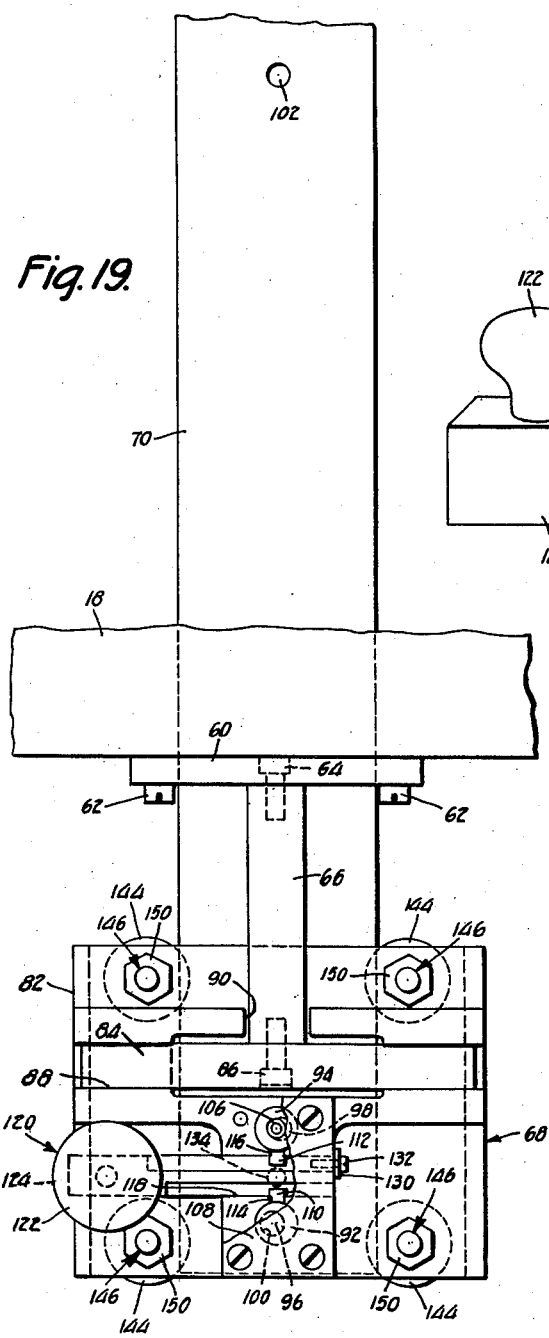
INVENTOR.
Abraham Novick
BY
Moses, Nolte, Crewe & Berry
ATTORNEYS Dec. 10, 1957  A. NOVICK  2,815,810
DIE PRESS
Filed May 26, 1951  23 Sheets-Sheet 13
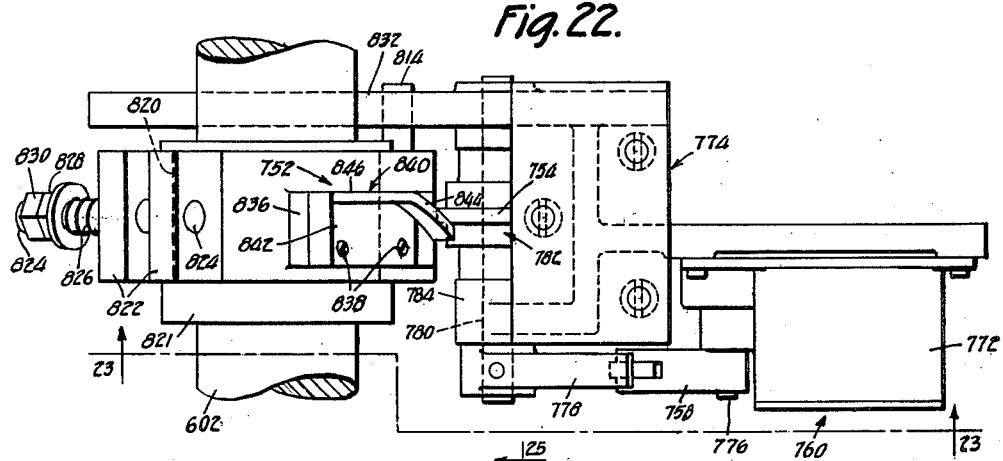
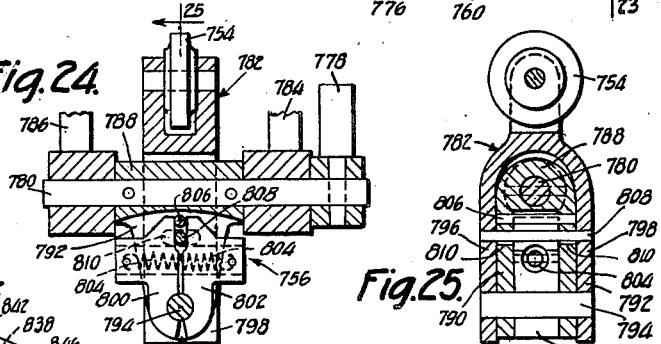
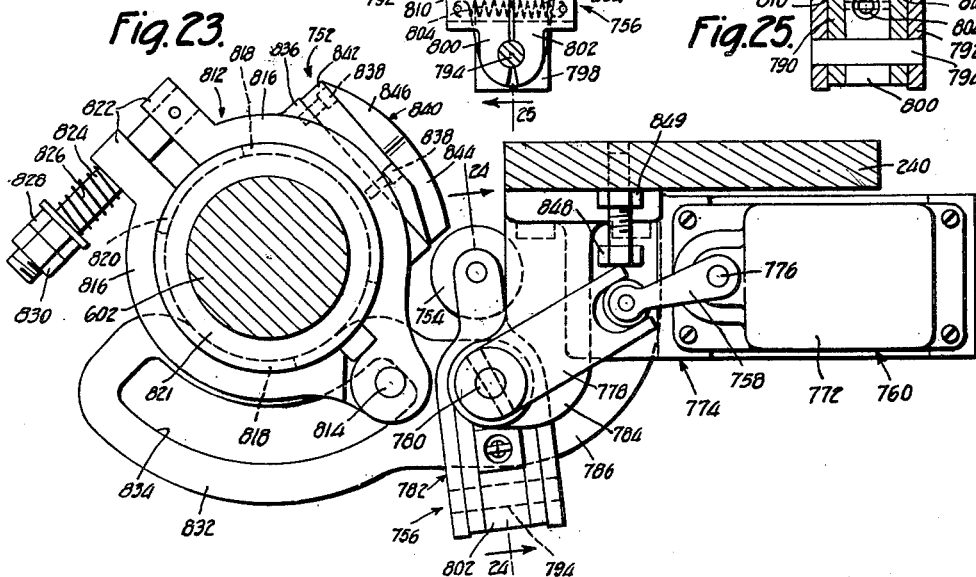
INVENTOR.
Abraham Novick
BY
Moses, Nolte, Crews & Berry
ATTORNEYS Dec. 10, 1957  A. NOVICK  2,815,810
DIE PRESS Filed May 26, 1951  23 Sheets-Sheet 14

INVENTOR.
Abraham Novick
BY
*Moses, Nolte, Crews & Berry*
ATTORNEYS

Dec. 10, 1957 A. NOVICK 2,815,810
DIE PRESS
Filed May 26, 1951 23 Sheets-Sheet 15

INVENTOR.
Abraham Novick
BY
Moser, Nolte, Crews + Berry
ATTORNEYS

Dec. 10, 1957  A. NOVICK  2,815,810
DIE PRESS
Filed May 26, 1951  23 Sheets-Sheet 16

INVENTOR.
Abraham Novick
BY
Mosco, Nolte, Crews & Berry
ATTORNEYS

Dec. 10, 1957          A. NOVICK          2,815,810
DIE PRESS
Filed May 26, 1951          23 Sheets-Sheet 17
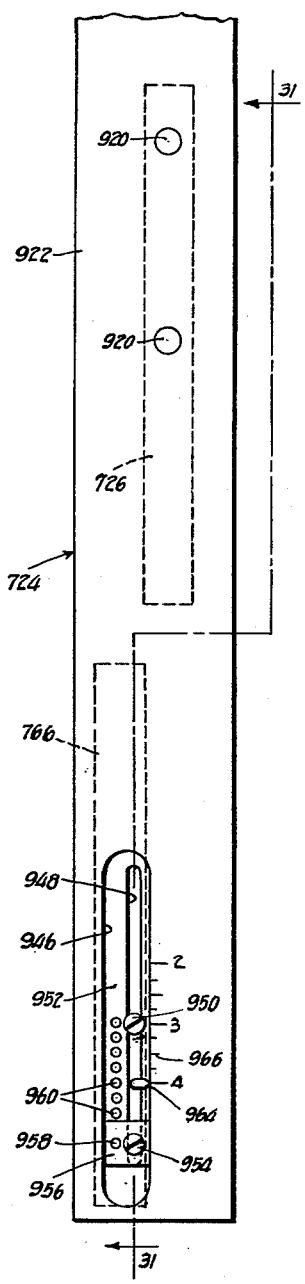
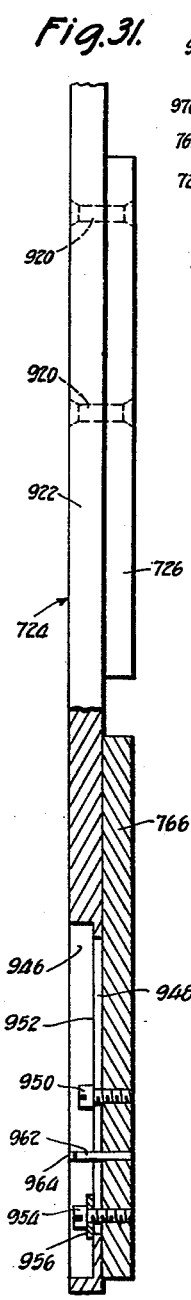
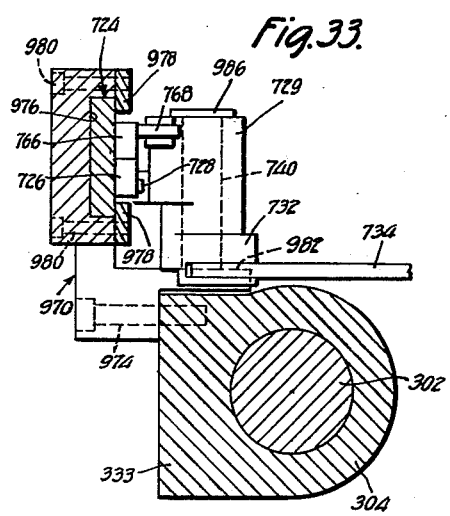
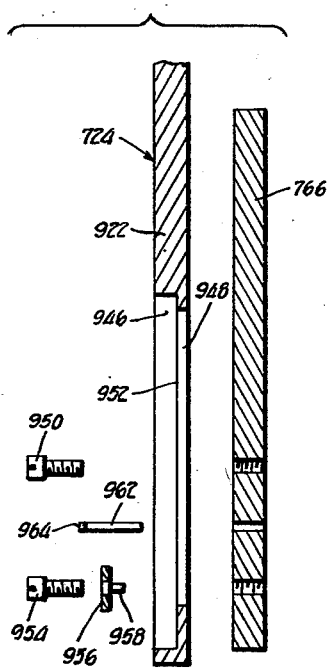
INVENTOR.
Abraham Novick
BY
Moses, Nolte, Crews & Berry
ATTORNEYS INVENTOR.
Abraham Novick
BY
Moses, Nolte, Crews & Berry
ATTORNEYS

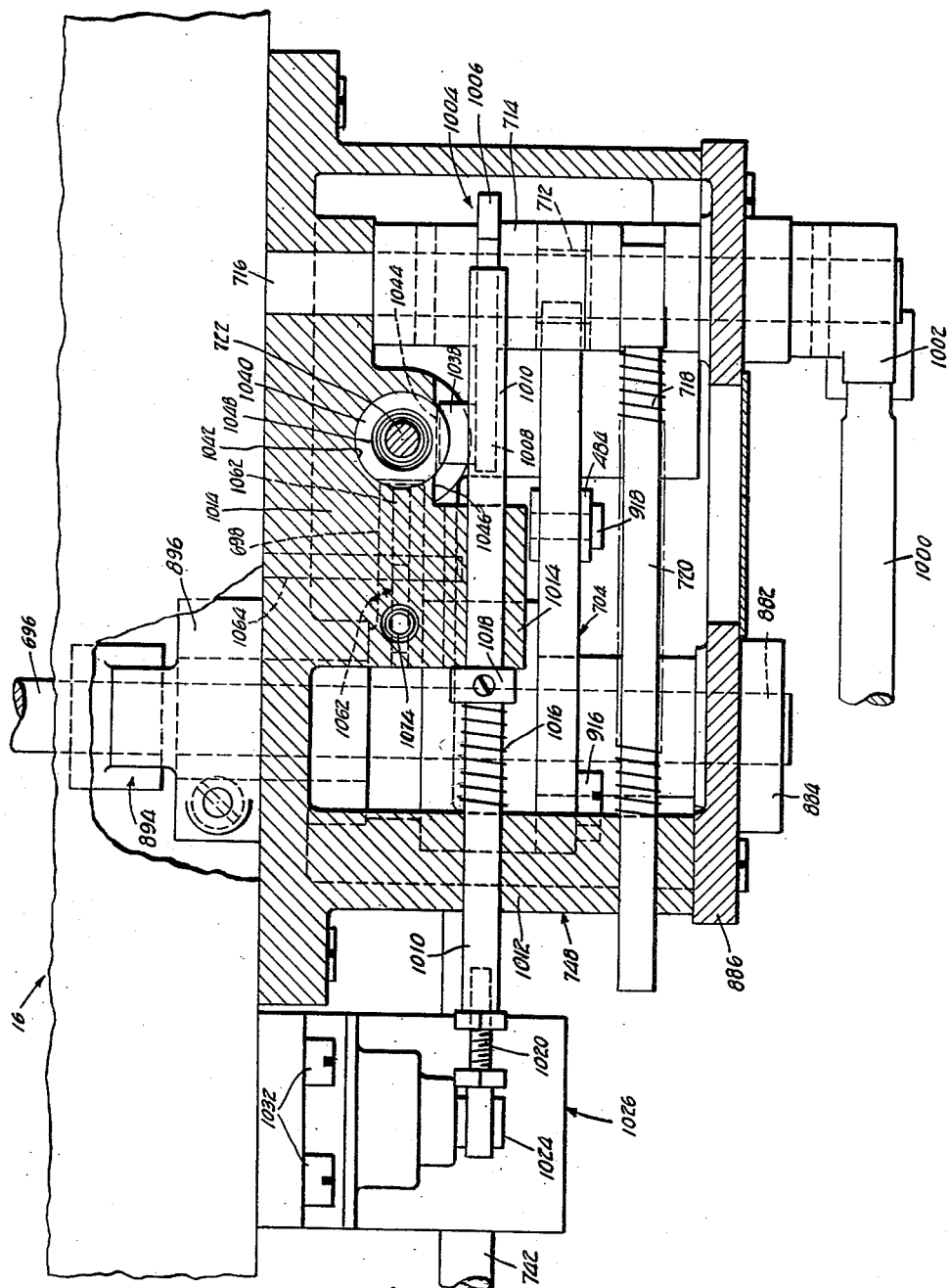

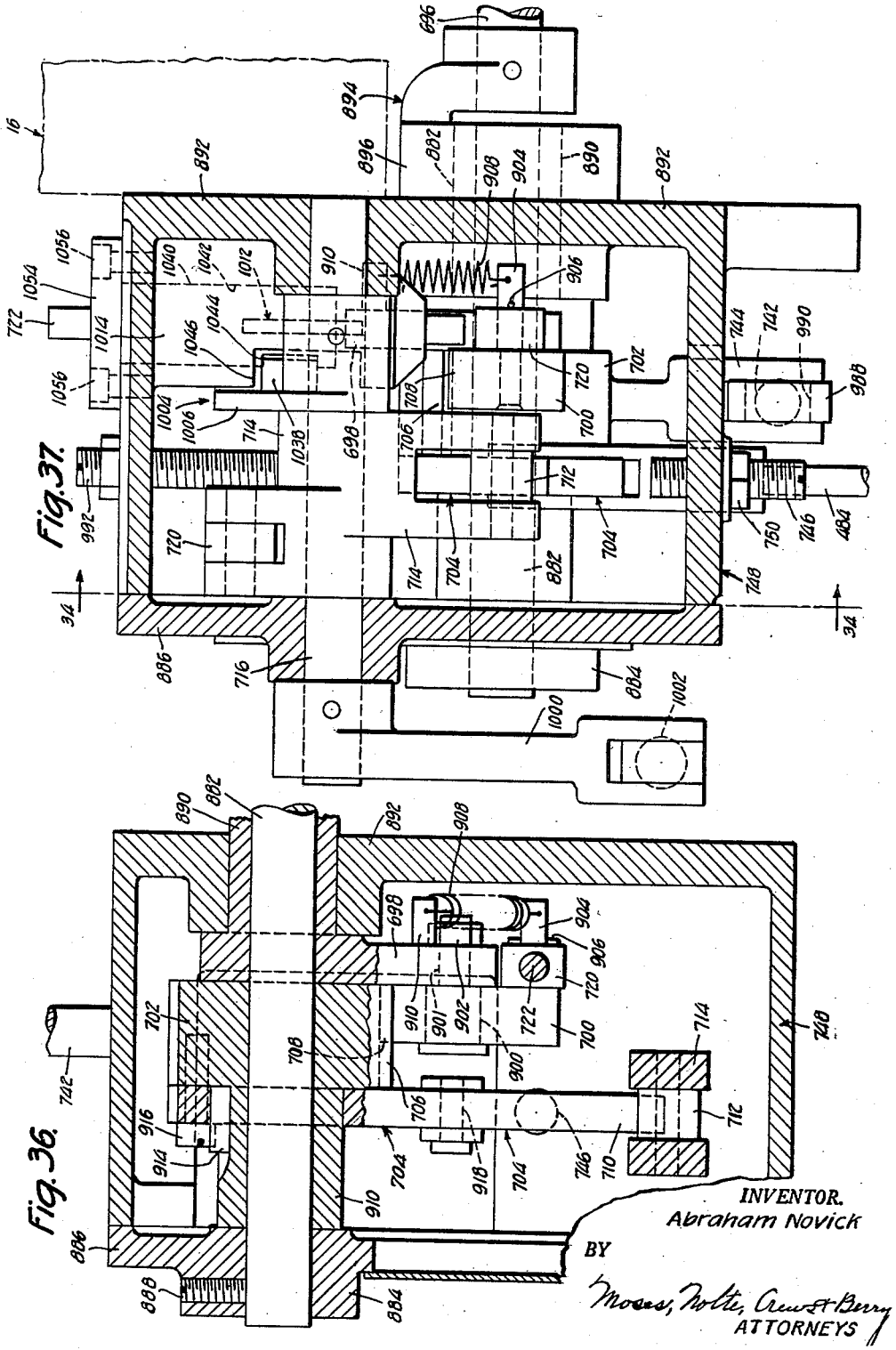

Dec. 10, 1957     A. NOVICK     2,815,810
DIE PRESS

Filed May 26, 1951     23 Sheets-Sheet 21

INVENTOR.
Abraham Novick
BY
Moses, Nolte, Crews & Berry
ATTORNEYS

Dec. 10, 1957  A. NOVICK  2,815,810
DIE PRESS
Filed May 26, 1951  23 Sheets-Sheet 22
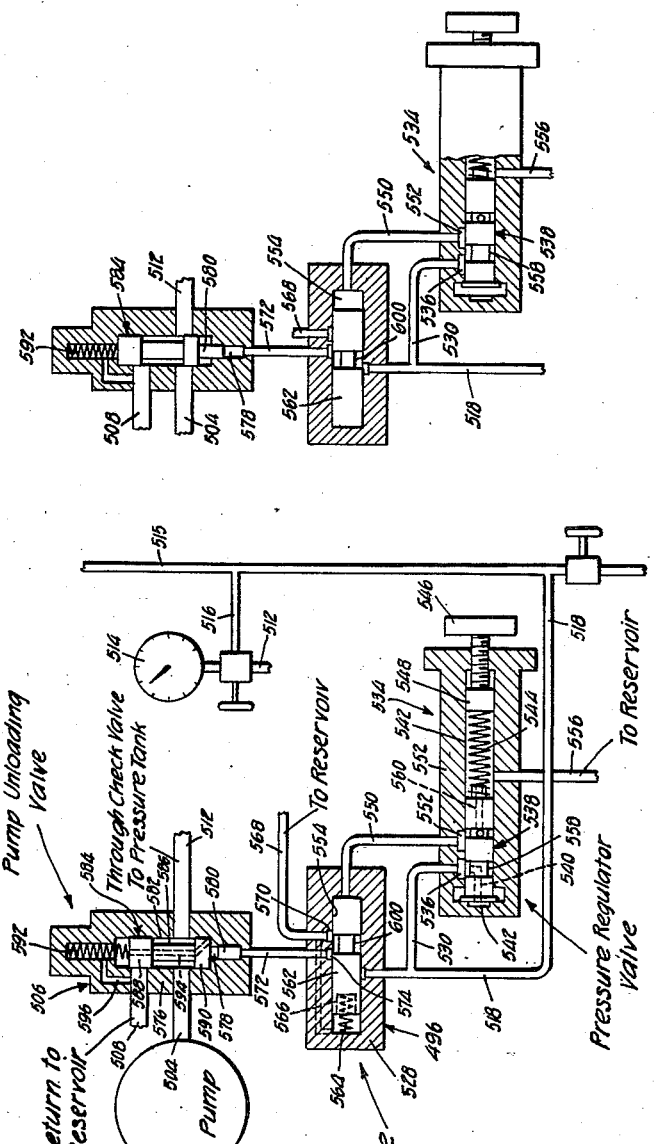
INVENTOR.
Abraham Novick
BY
Moses, Nolte, Crews & Bern
ATTORNEYS

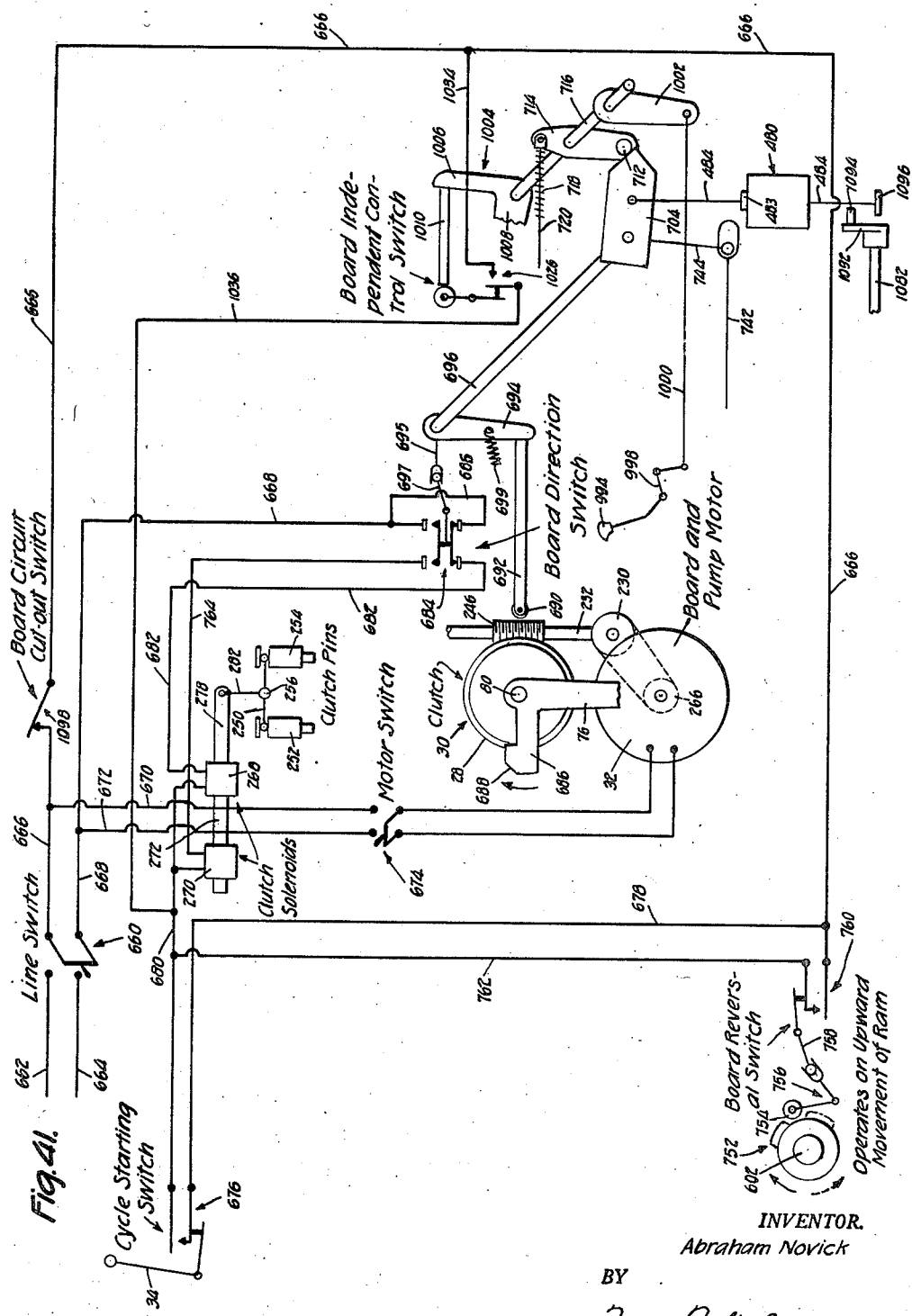

United States Patent Office 2,815,810
Patented Dec. 10, 1957

2,815,810

DIE PRESS

Abraham Novick, Flushing, N. Y., assignor to F. L. Smithe Machine Co., Inc., New York, N. Y., a corporation of New York Application May 26, 1951, Serial No. 231,367

The terminal portion of the term of the patent subsequent to October 15, 1974, has been disclaimed 13 Claims. (Cl. 164—23)

This invention relates to machines for die cutting paper or other sheet material arranged in stack form by pressing a die through the stack.

In accordance with a common practice of the prior art, provision is made of a machine known as a standard die press which comprises a continuously reciprocating plunger head or ram driven from a shaft equipped with a heavy fly wheel. The operator places the stack of sheet material upon the cutting board, places the die in a desired position upon the stack, and then, while the ram is in the upper range of its movement, thrusts the board with the supported stack and die under the ram so that the die will be driven through the stack by the head upon the next descent of the ram. The operator then withdraws the board with the supported stack and die from beneath the head, as the ram moves upward away from the stack and before the ram has had time to descend a second time. The operation is repeated after a short period, depending upon the time required by the operator to remove and dispose of the cut blanks, and to effect a fresh arrangement of the die on the stack.

This procedure of manually shifting the cutting board is laborious for the operator and requires skillful timing on his part. He must be careful to get the die under the ram at the right moment. He must also be careful to have the die fully under the ram, as the die is likely to be broken if it is only partly under. There is also another disadvantage to this operation, and that is the element of danger for the operator. He must be extremely careful that his fingers do not become caught under the cutting head as he pushes the board and stack into cutting position. It is common practice, moreover, when nothing but waste or scrap remains of the stack of sheets, to push the waste stack rearwardly out of the machine across the cutting table. In doing this, the operator must be very careful to avoid injury to his hands by the ram.

As an alternative to the above practice, it has been proposed to dispense with the continuous operation of the ram and to effect a mechanical organization whereby the operator, when he has produced the desired arrangement of the cutting board, stack and die, may initiate a mechanically controlled cycle of operations in which the board is first carried inward to locate the die under the ram, the ram is then caused to descend and return, and the board is withdrawn. In an arrangement of this kind a constantly running fly wheel is arranged to be connected from time to time to a clutch to operate the normally idle ram. Since great power is required for driving the die through the sheets, the clutch must be capable of very heavy duty, and the parts are accordingly of massive construction and are subjected to rapid wear. Disablement of the machine occurs frequently.

As an improvement upon the structure referred to above, it has been proposed in United States Patent No. 2,259,320, granted jointly to Daniel Novick and myself on October 14, 1941, to provide a die press comprising fly wheel mechanism for constantly operating the ram, in combination with mechanically operated cutting board actuating mechanism adapted to be rendered operative normally at the will of the operator, and arranged when so rendered operative to carry out a single cycle of cutter board operations in mechanically synchronized relation with the cycle of operation of the plunger head.

This arrangement, while an improvement upon its predecessors, involved the element of danger incident to the disposal of waste during reciprocation of the plunger head, and also had the disadvantage that maximum operating power must be delivered at all times, during idle as well as active strokes of the plunger.

None of the mechanisms referred to have any capacity for adjustment of extent of ram stroke.

Finally, in my pending application for letters patent of the United States, Serial No. 126,187 filed May 8, 1949, for die presses, there is disclosed a die press in which the ram is operated directly by hydraulic power. In this die press the ram and the cutting board are both normally idle but are both power operated in definitely timed relation to one another. When the operator has arranged the lift of paper sheets and the die in a desired arrangement upon the cutting board, he actuates a switch to initiate an inward movement of the cutting board. The cutting board moves inward and comes to rest, but before doing so it trips a valve to initiate downward movement of the ram by hydraulic power. The ram, near the lower limit of its downward movement, trips a reverser which causes the hydraulic power to be applied to restore the ram to its upper position and there to arrest it. The ram, as it moves upward, initiates an outward movement of the cutting board. The cutting board thereupon moves outward to its initial position and comes to rest. This machine has proved to be a very great advance over its predecessors. Various features of improvement have been developed. however, and it is these improvements which form the subject of the present invention.

One important feature of the invention has to do with novel means through which the ram operating piston rods are connected to operate the ram. In Serial No. 126,187 the upper and lower pistons both operate the ram through piston rods which pass upward through the heads of the upper cylinders for direct connection to the ram. This tends to permit the escape of oil from the upper cylinders and the deposit of dust and dirt on the piston rods which work into and out of the upper cylinders.

This objectionable feature is avoided in the case of the present invention by providing connecting rods which extend only out of the open ends of the upper and lower cylinders, and connecting the free ends of the rods to common ram operating mechanism. It is a point that the common ram operating mechanism referred to is so contrived that the piston rods may be vertically overlapped to avoid increasing the total height of the machine.

Another important feature of the present invention has to do with the provision of improved equalizing mechanism. In Serial No. 126,187 two piston rods extending upward from the cylinders are directly connected to the ram midway between the front and rear edges thereof, and front and rear equalizers are provided for maintaining the front and rear edges of the ram horizontal at all times, these equalizers including four corner rods which serve exclusively as equalizing and guiding members. This involves employment of a large number of parts and throws the strain of fore and aft equalization entirely upon the connections of the corner rods and the piston rods with the ram. The corner rods are connected to one another only at the upper ends through the ram itself. The connecting rods operate into high-pressure oil-containing cylinders and may affect the oil seals and the pistons adversely if subjected to equalization strains.

In accordance with the present invention, the four corner rods are used both for transverse equalization and for the actual operation of the ram. The pistons at opposite sides of the machine are connected rigidly with two associated corner rods through massive connecting blocks which, together with the rods and the ram itself, form rigid rectangles at opposite sides of the machine for effecting fore and aft equalization.

A further feature of the invention has to do with a novel combination of the frame and table members with guide sleeves which are provided for the ram operating rods. The guide sleeves are carried by the table, the table rests upon side frame members, and the guide sleeves constitute means of connection between the frame members and the table. In accordance with another feature, both the upper and lower cylinders are mounted from the table. In this way, the need for a heavy and rigid bottom plate to withstand the thrust and pull of the cylinders and pistons is obviated.

Still another feature has to do with the provision of simplified and improved control mechanism for the cutting board operating clutch.

An important feature has to do with the provision of an improved switch control mechanism for initiating outward movement of the cutting board. In accordance with a practical and advantageous embodiment, a cam, driven by the ram, is frictionally driven and controlled to operate through the same range and in the same portion of the upward ram stroke, regardless of variations in the upper and lower limits and the extent of such stroke. It is a further point that the cam and cam follower are arranged to pass one another idly during the downward ram stroke but to produce a switch operation during the upward ram stroke.

It is an object of the invention to simplify and improve the organization of the machine generally with a view to obtaining a simple, light, compact, convenient, efficient and rugged machine, and to improve various individual mechanisms in detail.

Other objects and advantages will hereinafter appear.

In the drawing forming part of this specification,

Figure 2 is a view in front elevation of the die press shown in Figure 1, some of the parts being broken away and some of the parts being omitted;

Figure 3 is a fragmentary view in front elevation of clutch mechanism employed in the driving of the cutting board;

Figure 8 is a longitudinal vertical sectional view taken upon the line 8—8 of Figure 9, looking in the direction of the arrows;

Figure 9 is a transverse vertical sectional view taken upon the line 9—9 of Figure 8, looking in the direction of the arrows;

Figure 10 is a fragmentary detail sectional view taken upon the line 10—10 of Figure 8, looking in the direction of the arrows;

Figure 11 is a longitudinal vertical sectional view taken upon the line 11—11 of Figure 5, looking in the direction of the arrows, and upon a considerably larger scale than the preceding figures;

Figure 12 is a longitudinal vertical sectional view taken upon the line 12—12 of Figure 5, looking in the direction of the arrows, the view being upon the same scale as Figure 11;

Figure 13 is a detail sectional view taken upon the line 13—13 of Figure 12 looking in the direction of the arrows;

Figure 14 is a detail fragmentary view in elevation with parts broken away, the parts shown in section being taken upon the line 14—14 of Figure 13, looking in the direction of the arrows;

Figure 15 is a detail sectional view taken upon the line 15—15 of Figure 12, looking in the direction of the arrows;

Figure 16 is a fragmentary view partly in elevation and partly in section of the upper portion of the forward end of the machine, the section being taken upon the line 16—16 of Figure 18, looking in the direction of the arrows;

Figure 17 is a fragmentary view complementary to Figure 16 and showing the lower front portion of the casing which surrounds the motor and the forward closure cover therefor;

Figure 19 is a fragmentary plan view of table stroke adjusting mechanism also illustrated particularly in Figure 18;

Figure 20 is a perspective view of a shifting handle illustrated in Figure 19;

Figure 21 is a detail sectional view taken upon the line 21—21 of Figure 7 looking in the direction of the arrows;

Figure 22 is a fragmentary plan view of parts shown in Figure 23;

Figure 23 is a fragmentary, longitudinal, vertical, sectional view taken on line 23—23 of Figure 22, looking in the direction of the arrows;

Figure 24 is a fragmentary, vertical, transverse, sectional view, the section being taken on the line 24—24 of Figure 23, looking in the direction of the arrows;

Figure 25 is a fragmentary, longitudinal, vertical, sectional view taken on the line 25—25 of Figure 24, looking in the direction of the arrows;

Figure 28a is a detail sectional view, the section being taken on the line 28a—28a of Figure 28, looking in the direction of the arrows;

Figure 30 is a fragmentary detail view in side elevation of parts shown in Figure 29, the scale of Figure 30 being larger than that of Figure 29;

Figure 31 is a fragmentary view in front elevation, partly in section, the section being taken on the line 31—31 of Figure 30, looking in the direction of the arrows;

Figure 32 is an exploded view of the lower parts shown in Figure 31;

Figure 33 is a horizontal sectional view taken on line 33—33 of Figure 29, looking in the direction of the arrows;

Figure 35 is a fragmentary sectional view taken on the line 35—35 of Figure 34, looking in the direction of the arrows;

Figure 36 is a fragmentary, horizontal, sectional view taken on the line 36—36 of Figure 34, looking in the direction of the arrows;

Figure 37 is a fragmentary, longitudinal, vertical, sectional view taken on the line 37—37 of Figure 34, looking in the direction of the arrows;

Figures 39 and 40 are detail, schematic views showing some of the parts illustrated in Figure 38; and Figure 41 is a schematic view illustrating the electrical system and certain of the parts associated therewith.

The illustrative die press comprises upright side frame members 10 (Figures 1, 2, 5, 8 and 0) which are connected to one another near their lower ends through cross bars 12 and 14, and at their upper ends through a table 16, together with other parts hereinafter to be described. The table 16 constitutes a support for a slidable cutting board 18 against the pressure of a reciprocable ram 20 during the cutting operation.

Without regard to detail, the general principle of the illustrative mechanism (which is the same as that of Serial No. 126,187) will be briefly outlined at this point as an aid to the ensuing description.

Figure 1:
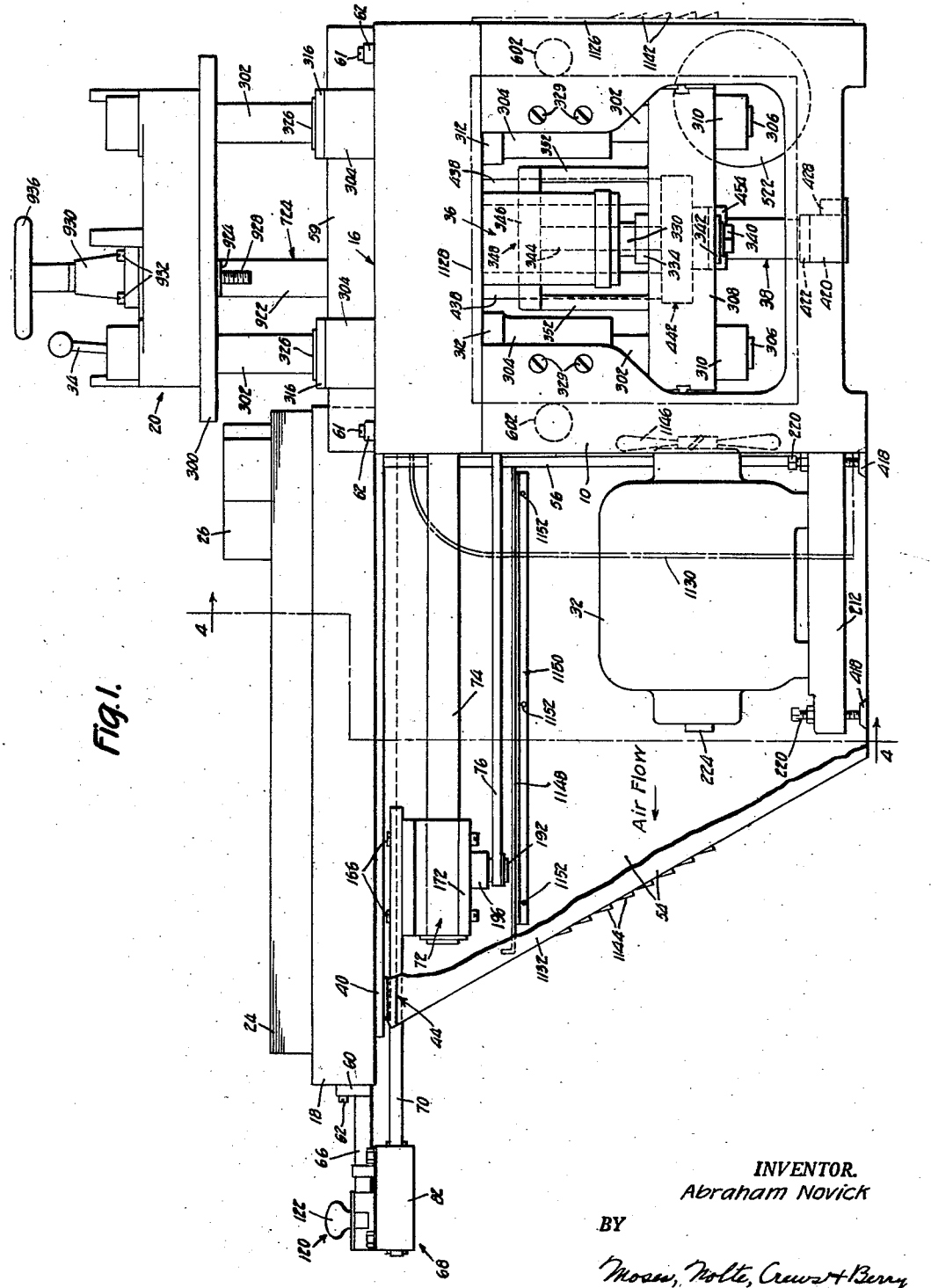
Figure 1 is a view in side elevation, partly broken away and with some parts omitted, of a novel die press embodying features of the invention.

The cutting board 18 normally occupies a retracted position, as illustrated in Figure 1, and carries upon it a stack or lift 24 of paper sheets from which blanks to be cut by means of a cutting die 26. All of the parts normally stand idle, except a worm gear 28 (Figures 4, 5 and 7), forming one element of a clutch 30, which is constantly driven by a motor 32.

When the die 26 has been properly placed upon the stack 24 and it is desired to effect an operation, a tripping switch handle 34 (Figure 2) is actuated by the operator. This energizes an electromagnet through which the clutch 30 is rendered active for a half revolution, causing the cutting board 18 to be moved rearward for a distance equal substantially to one-half its length and then to come to rest.

As an incident of the last portion of such rearward movement, a control valve is shifted to cause liquid under pressure to be admitted to upper cylinders 36 (Figures 1 and 2) of a hydraulic system to drive the ram 20 downward. Such downward movement of the ram 20 occurs with the cutting board 18 idle, and is effective to drive the die 26 through the stack 24. It also serves at the conclusion of such downward movement to shift the hydraulic control valve and cause the liquid under pressure to be admitted to lower cylinders 38 and discharged from the upper cylinders 36. This automatically reverses the direction of movement of the ram 20 and causes the ram to be returned to its normal position as illustrated in Figure 1.

As the ram moves upward, it causes the cutting board operating clutch 30 to be again tripped and to produce a second half revolution of the cutting board actuating mechanism, whereby the cutting board is restored to its original or normal position as illustrated in Figure 1. At the conclusion of the upward movement of the ram 20, the ram is brought automatically to rest so that the parts are fully restored and ready for a second cycle of operation as soon as the operator has disposed of the cut blanks and relocated the die 26 for a fresh cut.

The cutting board 18 rests in its Figure 1 position upon supporting bars 40 (see Figures 4, 7 and 18 also), which extend forwardly from the table 16 with their upper faces in the same horizontal plane as the upper face of the table. Each bar 40 is secured through screws 42 to an angle bar 44 upon which the bar 40 rests. The angle bars 44 at their rear ends are formed with downturned ears 46, through which they are connected by screws 48 to the forward face of the table.

Each angle bar 44 has a downturned flange 50 which extends lengthwise of the bar, and which is secured by rivets 52 to a vertical plate 54. The plates 54 rest on the floor and constitute side enclosing walls for housing the motor 32. The plates 54 assist the table in supporting the bars 40. The plates 54 are reinforced along their upper margins by the angle bars 44 and along their rear vertical margins by angle bars 56. The reinforcing angle bars 56 are secured at their upper ends to the table 16 by suitable fasteners, such as rivets 58.

The cutting board 18 is made of hard wood. It is arranged to slide on the table and on the bars 40 between side guides 59, Figures 1 and 2, which guides are secured upon the table by screws 61, the screws being passed downward through lugs 63 integral with the guides. A bracket 60 (Figures 1, 16, 18 and 19) is connected to the board 18 by screws 62 which are threaded rearwardly into the board 18. A headed screw 64, passed forwardly through the bracket 60, is threaded into a board operating rod 66. The rod 66 is connected at its forward end to a connecting device 68, to be described presently, which device is adjustably connected to a tongue 70. The tongue 70 extends rearwardly from the connecting device, and is connected at its rear end to a slide block 72.

Figure 5:
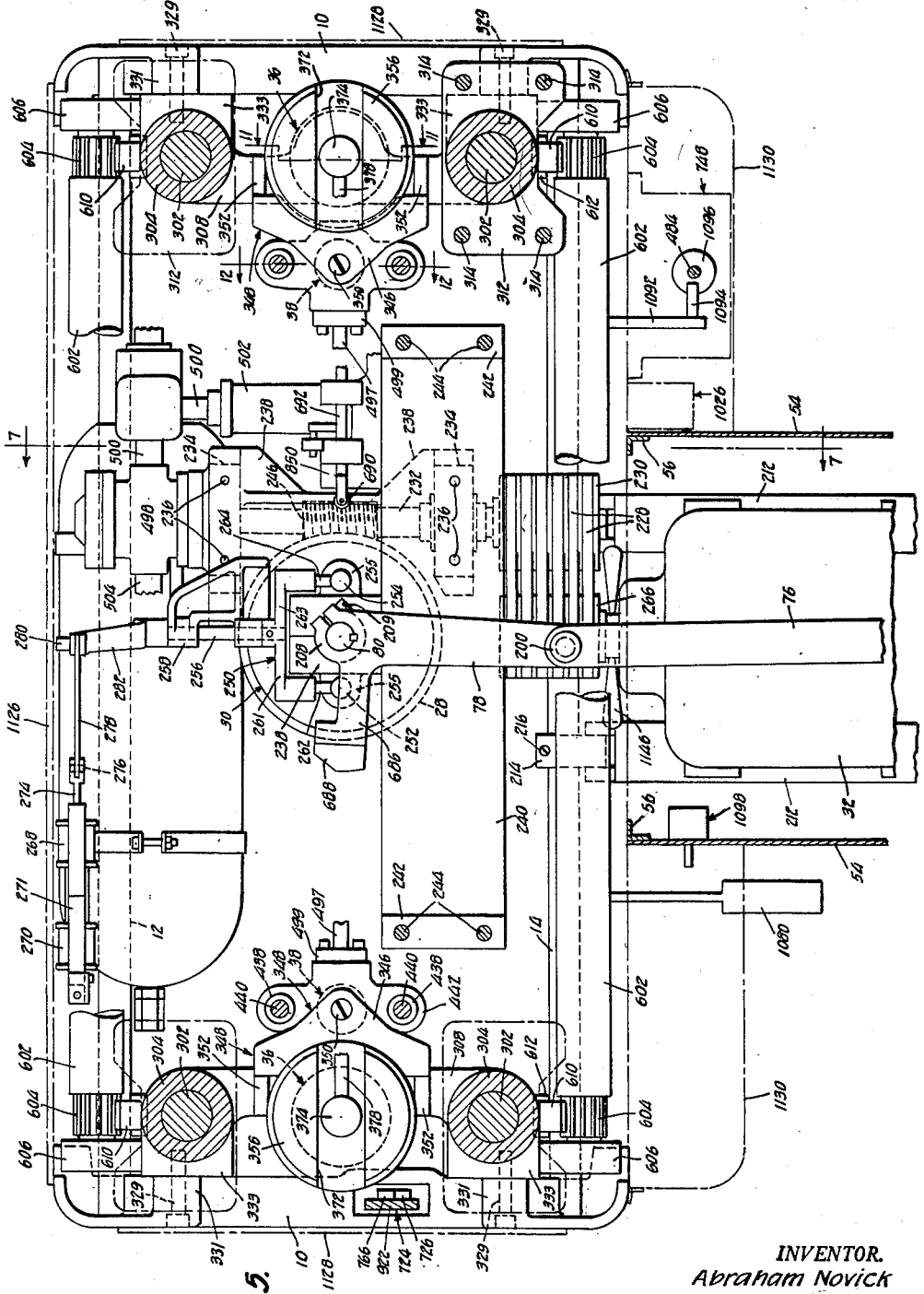
Figure 5 is a fragmentary horizontal sectional view taken substantially upon the line 5—5 of Figure 4, looking in the direction of the arrows.

The slide block 72 is mounted for sliding movement fore and aft of the machine on a fixed horizontal bar 74. The bar 74 is suitably secured at its rear end to the front of the table 16. The slide block 72 is pivotally connected to the forward end of a connecting rod 76. The rear end of the connecting rod is pivotally connected to the free end of a crank 78, which crank is fixed to a driving shaft 80 (Figure 5).

It is desirable that the stroke of the cutting board operating mechanism be short, since this enables the drive mechanism to be of compact construction and saves time and operating energy in the operation of the machine. As in Serial No. 126,187, the illustrative mechanism is designed to effect a cutting table stroke equal substantially to one-half the length of the cutting board, while provision is made for connecting the connector device 68 through a block 82 (Figure 16), which forms a part of the device, in either of two positions relative to the tongue 70. When one of the connections is made effective, the rear half of the cutting board is carried alternately beneath and clear of the ram 20, but when the other connection is made effective, the forward half of the cutting board is carried alternately beneath and clear of the ram. This is the same in principle as Serial No. 126,187, but the present machine includes a connecting device of novel and advantageous construction.

Figure 18:
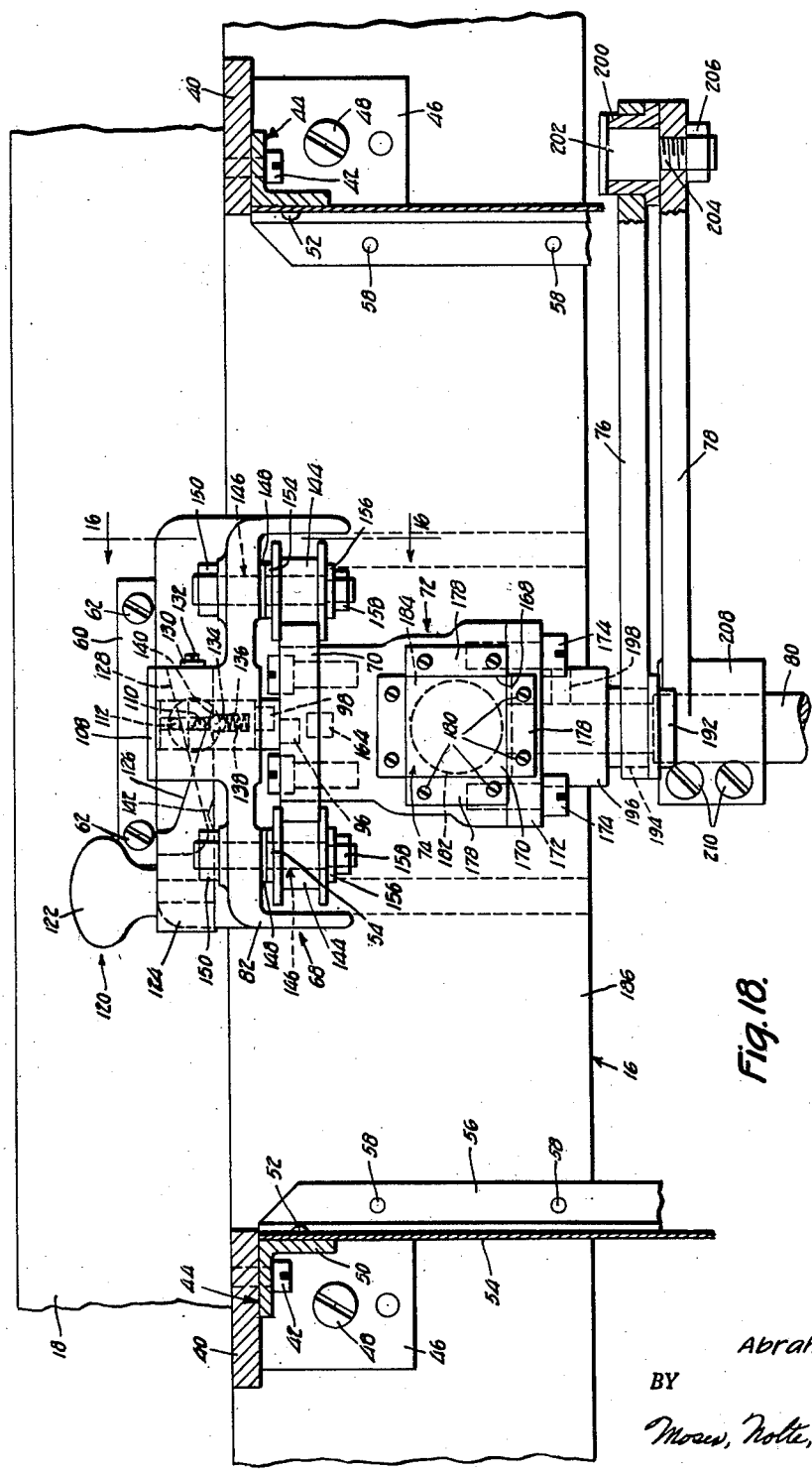
Figure 18 is a fragmentary view in front elevation but with some parts shown in section.

The novel connecting device for selectively effecting these connections between the block 82 and the tongue 70 is illustrated best in Figures 16, 18 and 19. The rod 66 is connected at its forward end to a cross bar 84 by means of a screw 86. The cross bar 84 rests in an open faced channel 88 which is formed in the upper portion of the block 82. The rod 66 extends into the block 82 through an open slot 90 formed in the upper face of the block. With this arrangement, rod 66 and cross bar 84 are left free to shift vertically relative to the block 82. The rod 66 and the cross bar 84 can operate at different levels relative to the block 82, there being no need for securing the bracket 60 to the block at a prescribed level. The construction also enables the rod and the cross bar to be lifted out of the machine with the cutting board at will, whenever reconditioning or replacement of the board is required.

The alternative connections of the block 82 with the tongue 70 are effected through forward and rear plunger pins 92 and 94, respectively, which pins are mounted for vertical movement in bores formed in the block 82.

The pins 92 and 94 include reduced eccentric portions 96 and 98, respectively, at their lower ends. The portions 96 and 98 are designed to interfit respectively with bores 100 and 102 formed in the tongue 70. In Figure 16 the forward pin 92 is shown with its reduced portion 96 engaged in the tongue bore 100, while the pin 98 is shown in an inactive position.

The pins 92 and 94 are formed with bores 104 in which compression coil springs 106 are contained. Each spring 106 thrusts the associated pin downward, the reaction force being sustained by a cover plate 108 which is secured in fixed position on the block 82.

The bores 100 and 102 in the tongue 70 are disposed out of alignment with one another in the direction of movement of the tongue. It is for the purpose of enabling the pins 92 and 94 to cooperate selectively with the bores 100 and 102 that the reduced extensions 96 and 98 are made eccentric. The pins 92 and 94 are provided with side pins 110 and 112 which extend through slots 114 and 116 of the block 82 (Figure 19). The pins 110 and 112 in cooperation with the slots 114 and 116 determine the orientation of the pins 92 and 94, and thereby serve to maintain the reduced portions 96 and 98 in cooperative alignment, respectively, with the bores 100 and 102.

The free ends of the pins 110 and 112 extend into a cross channel 118 which is formed in the upper face of the block 82. A cam slide 120 is mounted to slide in the channel 118, being confined therein by the cover plate 108. The cam slide 120 has a handle portion 122 and a body portion 124 (Figure 20). The body portion 124 is formed with two upwardly facing, oppositely sloping cam portions 126 and 128, upon which the respective pins 110 and 112 bear.

As shown in Figures 16 and 19, the cam 128 is holding the pin 112 up to maintain the pin extension 98 out of engagement with the tongue 70. The pin 110, however, overlies a low part of the cam 126, and hence permits the pin extension 96 to be engaged in the bore 100 of the tongue 70. In this condition of the parts the cam slide 120 is at the left hand limit of its movement (as viewed in Figure 18). The cam slide 120 is restricted against further leftward movement by a stop washer 130 which is secured to the right end of the cam slide 120 (Figure 19) by a screw 132. The stop washer 130 extends beyond one of the lateral bounds of the slide 120 into position to be intercepted and arrested by the right hand face of the block 82.

The cam slide 120 is retained against accidental shifting from the position illustrated by a detent ball 134 (Figure 18) which is lodged in a bore 136 of the block 82, and which is urged upward by a compression coil spring 138 lodged in said bore. The detent ball 134 yieldingly engages a shallow recess 140 formed in the lower face of the cam slide 120, as shown.

The connections shown as effective serve to reciprocate the rear end of the cutting board 18 backward and forward to and from cutting position beneath the ram 20.

To change the connections so that the forward end of the cutting board 18 will be reciprocated backward and forward to and from cutting position beneath the ram, the drive shaft 80 is first operated through a half revolution to carry the tongue 70 to its rearward limit of movement and cause it to stop in that position. This movement of the tongue 70 carries the cutting board rearward with it, serving to locate the rear half of the cutting board beneath the ram. The handle portion 122 of the cam slide 120 is then seized and thrust toward the right (Figure 19) to shift the slide 120 to its right hand limit of movement. This withdraws the pin extension 96 from the bore 100 and releases the extension 98 for projection by its spring into engagement with the tongue 70. The cam slide 120 is retained yieldingly in its new postion by engagement of the detent ball 134 in a second shallow recess 142 of the slide.

The pin extension 98 cannot enter the bore 102 because the bore is at this time located far to the rear of it. By now restoring the tongue 70 to its forward limit of movement, however, the bore 102 will be caused to travel forward into alignment with the pin extension 98. The pin extension 98 thereupon snaps into the bore 102 (Figure 16), automatically securing the block 82 in the desired new relationship to the tongue 70.

When it is desired to change the connections back for reestablishing the conditions illustrated in the drawing, the operator first seizes the cam slide 120 by the handle 122 and thrusts it to its left hand limit of movement (Figure 19). He then operates the tongue 70 independently of the block 82, to its rearward limit of movement, whereupon the pin extension 96 snaps into the bore 100 to reestablish the original connections. The tongue 70 is then returned to its left hand limit of movement (Figure 16) carrying the cutting board along with it, so that the original condition of rest is obtained.

The connecting device 68 (Figures 16, 18 and 19) is provided with quadrangularly related flanged guide rollers 144 which embrace longitudinal marginal portions of the tongue 70 for guiding the tongue 70 relative to the connecting device 68 as the tongue moves with relation to the connecting device during the above described changes of connections.

The rollers 144 are supported from the four corners of the block 82. They are all alike, and therefore a description of one will suffice for all. Each roller is rotatably supported on a headless bolt 146, which bolt includes a flange 148 intermediate its length. The upper end of the bolt 146 is passed upward through a corner of the plate 82 and is secured in place by a nut 150. A spacer sleeve 152 is mounted on the bolt 146 below the flange 148, being formed with a flange 154 at its upper end which bears against the flange 148. The roller 144 surrounds the body of the sleeve 152. The roller 144 is confined, with freedom for rotation, between the flange 154 of the sleeve and a washer 156. The washer 156 is clamped firmly against the lower end of the sleeve 152 by a nut 158 which is threaded on the lower end of the bolt 146.

The tongue 70, at the rear end thereof, is formed with a groove 160 which is opposed to a groove 162 in the slide block 72. A key 164 is lodged in the grooves 160 and 162 to assist in locating and securing the tongue 70 and slide block 72 relative to one another. Headed screws 166 are passed downward through the tongue 70 and threaded into the block 72.

The slide block 72 is formed with a square channel 168 at its lower end which slidingly fits a square portion 170 of the supporting and guiding bar 74. A plate 172 extends across the open lower side of the channel 168 and is secured to the slide block 72 by screws 174.

The slide block 72 is equipped with felt wiper strips 176 which engage the faces of the bar 74 to wipe the bar and apply lubricant to the bar. There are four of these strips 176 at each end of the slide block 72, with each strip lying against one of the bar faces. Each strip 176 is clamped in place by an angle plate 178. Each angle plate is attached to the slide block 72 by headed screws 180.

The bar 74 is formed at the rear end thereof with a round portion 182 (Figure 7), shoulders 184 being formed at the junction of the square and round portions of the bar. The round portion 182 is passed through a round hole formed in the forward flange 186 of the table 16. The rear extremity of the round portion 182 is received in a round hole formed in a lug 188 which extends downward from the table top and is formed integral with the table. A pin 190 is driven upward through the round portion 182 of the bar 74 and into the lug 188 for securing the bar 74 in place. The shoulders 184 of the bar 74 bear rearwardly against the table flange 186.

The link 76 is connected at its forward end to the slide block 72 through the plate 172 by means of a headed pin 192 (Figure 16). A flanged bushing 194, driven through the forward end of the link 76, surrounds the shank of the pin 192 and rests upon the head of the pin. The pin 192 is affixed to a boss 196 of the plate 172 by a cross pin 198.

The rear end of the link 76 has a flanged bushing 200 (Figures 7 and 18) driven through it. A headed pivot screw 202 is passed downward through the bushing and includes a reduced threaded end portion 204 which is passed downward through the outer end of the crank 78. A nut 206 is threaded onto the screw portion 204 to clamp the crank 78 firmly against a shoulder formed at the lower end of the body portion of the screw 202.

Figure 7:
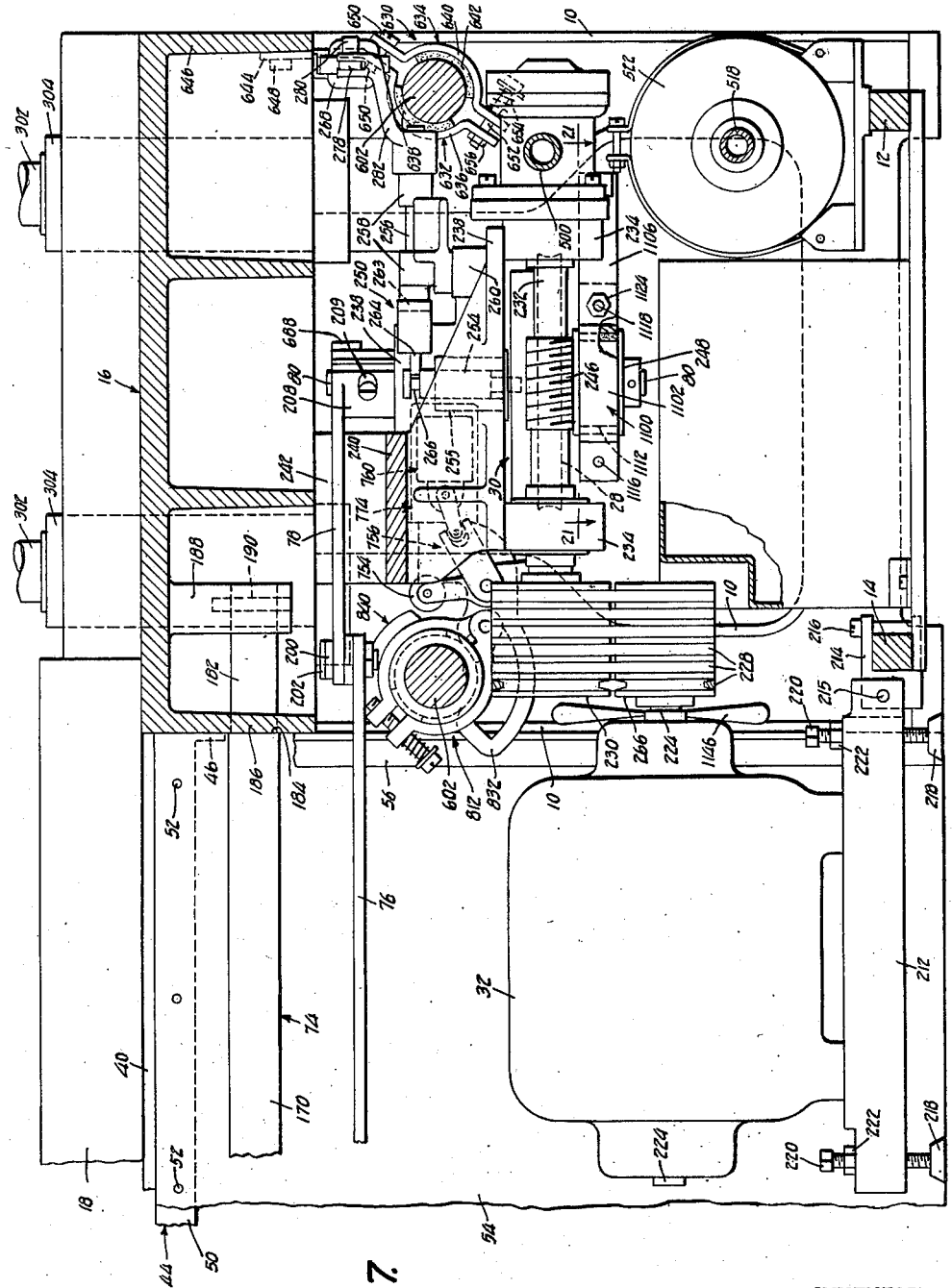
Figure 7 is a fragmentary longitudinal vertical sectional view taken substantially upon the line 7—7 of Figure 5, looking in the direction of the arrows.

The crank 78 is formed at its inner end with a split hub portion 208 (Figures 5 and 7). Clamping screws 210 bind the hub portion 208 to the drive shaft 80.

The mechanism for driving the tongue 70 comprises, as has been noted, a motor 32. Although the tongue 70 is normally idle, the motor runs constantly.

The motor 32 is secured upon supporting bars 212 which are forked at their rear ends. Each bar 212 embraces a rearwardly facing U-shaped clamp 214, and is connected to the clamp through a pivot pin 215. Each clamp 214 embraces the cross bar 14 and has its arms drawn into binding relation therewith by a headed screw 216 which is passed through the upper arm of the clamp and threaded into the lower arm. Each bar 212 carries adjustable feet 218 for engaging the floor to provide a level and steady support for the motor 32. Each foot is carried at the lower end of a headed screw 220. Each screw has threaded on it a lock nut 222.

The shaft 224 of the motor 32 (Figures 4, 5 and 7) has fast upon it a multiple-groove pulley 266 which, through V-belts 228, drives a multiple-groove pulley 230, fast on a worm shaft 232. The worm shaft 232 is rotatably supported in bearings 234 which are secured by screws 236 to a bracket 238. The bracket 238 is secured to a transverse horizontal plate 240. The plate 240 is suspended from the table 16. Spacer blocks 242 are interposed between the ends of the plate 240 and the table 16. Threaded securing screws 244 (Figure 5) are passed upward through the plate 240 and the blocks 242, being threaded into the table.

The shaft 232 has fast upon it a worm 246 which drives the worm wheel 28. The worm wheel 28 is mounted with freedom for rotation upon the vertical shaft 80, being supported on the shaft by means of a brake pulley or drum 248 (Figure 7) which is made fast on the shaft 80 at the lower end thereof. The shaft 80 extends upward through the bracket 238, and has the hub 208 of the crank 78 secured upon its upper end. The hub 208 bears against an upper face of the bracket 238 and serves to support the shaft with freedom for rotation in the bracket.

The worm wheel 28 drives the brake pulley 248 and the shaft 80 through the half revolution clutch 30. The clutch 30 is the same in construction as the corresponding half revolution clutch of Serial No. 126,187 and is not therefore shown nor described in detail herein. Reference may be had to the disclosure of Serial No. 126,187, which is made a part hereof by reference.

The half revolution clutch 30 is controlled from a rocker yoke 250 (Figures 3, 4, 5 and 7) through two pins 252 and 254. The pins 252 and 254 are separated from one another by 180° of rotation of the shaft 80, being mounted for vertical sliding movement in extensions 255 of the bracket 238. They are controlled by the rocker yoke 250 in such a way that, upon the withdrawal of one of them to an ineffective position (to permit driving of the shaft 80 from the worm wheel 28 as in Figure 3), the other is projected to an effective position in which it will interrupt the drive of the shaft 80 at the end of a half revolution.

The yoke 250 is made fast on a rock shaft 256, which shaft is supported in a two-armed bracket 258. The bracket 258 is set on a boss 260 of the bracket 238 and is suitably secured in fixed relation to the latter bracket. The yoke 250 includes arms 261 and 263 which extend in diametrically opposite directions from the shaft 256. The respective yoke arms carry pins 262 and 264 whose tips are at all times engaged in circumferential grooves 266 formed in the upper ends of the respective control pins 252 and 254. It will be readily apparent that if the pin 262 is raised by the rocker yoke 250 to lift the pin 252, as in Figure 3, the pin 264 will be lowered to depress the pin 254. When the rocker yoke is moved in the opposite direction the opposite effect is produced.

The mechanism for operating the rocker yoke 250 comprises two solenoids 268 and 270 (Figures 5 and 6) which are mounted on a stationary bracket 271, being spaced from one another and disposed in axially aligned relation. A common armature 272 is carried upon a rod 274 which extends through the solenoid 260. The armature is of ferro-magnetic material and is disposed between the solenoids to extend normally into each of them. When the solenoid 268 is energized the armature and rod are moved toward the right as seen in Figure 5, and when the solenoid 270 is energized the armature and rod are moved toward the left.

The rod 274 is connected through a pivot pin 276 to a link 278. The link 278 is pivotally connected at its opposite end through a pin 280 to a crank 282 which is fast upon the shaft 256, so that the linear motion of the rod 274 is converted into rocking motion of the shaft 256.

The parts are normally yieldingly maintained in an intermediate position by centering mechanism 284 (Figure 6) which acts upon the pin 280. The pin 280 is engaged at opposite sides by plunger pins 286 and 288 which are slidingly mounted in ears 290 of a stationary bracket 292. The bracket 292 is affixed to the table 16. Each of the plunger pins 286 and 288 is provided with a collar 294. Each pin is surrounded by a compression coil spring 296 which bears at its inner end against the associated collar 294 and at its outer end against the associated outer ear 290 of the bracket 292.

The purpose of the centering mechanism is to centralize the armature 272 relative to the solenoids 268 and 270, so that it will be normally disposed to be acted upon strongly and quickly by either of them. The centralization of the armature has the incidental effect of equalizing the positions of the clutch controlling pins 252 and 254. It is an important point that when the pins 252 and 254 are thus maintained at a common level, the lower ends of both are located at a clutch disabling level and one or the other of them is actually maintaining the clutch inactive.

The ram 20 comprises a head 300 (Figures 1 and 3) which is guided, supported and operated by four vertical rods 302 (see Figures 5, 9 and 10 also). Each rod 302 extends down through the table 16 and through vertical guide sleeves 304. The rods 302 protrude at their lower ends beyond the lower ends of the sleeves 304. The lower end portions 306 of the rods 302 are reduced and threaded. The two rods at the right hand side of the machine are connected rigidly to one another through a massive connecting block 308 (Figures 8 and 9). The block 308 is impaled upon the reduced lower end portions 306 of the associated rod 302, being secured to the rod by nuts 310. The lower end portions 306 of the rod 304 at the left-hand side of the machine are similarly connected to one another.

The guide sleeves 304 are rigidly supported by the table 16. Each sleeve is formed intermediate its ends with a generally rectangular flange 312 which bears upwardly against the lower side of the table. Headed screws 314 have their shanks passed upwardly through the flange and threaded into portions of the table. Each sleeve 304 receives at its upper and lower ends, flanged liner sleeves 316 (Figure 8) which are of harder metal than the sleeve 304 and are designed actually to guide the rod 302 and to take the wear incident to the operation of the rod. Each insert sleeve 316 has its body inserted in a recess 318 within the sleeve 304. Screws 320 are passed through the flange of each insert sleeve 316 and threaded into the sleeve 304. The upper insert sleeve 316 is formed with an annular recess 322 (Figure 10) in which a wiping and lubricating washer 324 is received. A retaining ring 326 covers the washer 324 and is secured to the insert sleeve 316 by headed screws 328.

The sleeves 304 constitute also means for securing the side frame members 10 to the table 16. Headed screws 329 are passed through bosses 331 of the side frame members 10 and are threaded into bosses 333 of the sleeves 304.

Driving mechanism for the ram 20 is provided at both the right side and the left side of the machine. These mechanisms are duplicates of one another so that a description of one will suffice for both. Power is supplied from the upper cylinders 36 (Figures 8 and 9) through the connector blocks 308 to drive the ram 20 downward, and power is supplied from the lower cylinders 38 through the connector blocks 308 to drive the ram downward.

A piston rod 330, whose function is to drive the ram downward, projects downward beyond the lower end of each upper cylinder 36. The rod 330 has a reduced lower end portion 332 (Figure 9) which is passed downward into a flanged bushing 334. The body of the bushing 334 fits in a bore 336 of the block 308. A headed screw 340 is passed upward through a flanged bushing 342 and is threaded into the lower end 332 of the rod 330. The rod 330 and the screw 340 clamp the block 308 between them through the medium of the flanges of the bushings 334 and 342. A shoulder 338 of the rod 330 bears against the flange of the bushing 334.

A piston rod 344 (Figures 8 and 9), whose function is to drive the ram 20 upward, projects upward beyond the upper end of each lower cylinder 38. The rod 344 is connected at its upper end to the body 346 (see Figure 5 also) of a yoke 348 by means of a headed screw 350. The yoke body 346 is disposed at a level substantially above the block 308, but it includes arms 352 which extend downward to, and are integral with, the block 308.

The upper cylinder 36 comprises a sleeve portion 354 (Figure 11) and a head portion 356. The portions 354 and 356 are connected to one another through rings 358 and 360 together with headed screws 362. The ring 358 is a split ring and is lodged in a shouldered circumferential channel 364 of the sleeve 354. The ring 360 bears upward against the ring 358, being drawn upward by the screws 362 whose shanks are passed through the ring 360 and threaded into the head 356. The described construction is effective to press the upper end of the sleeve together with a surrounding gasket 366 firmly against the inner face of the head.

The entire cylinder is supported from the table 16 through the head 356 by means of headed screws 368 which are passed downward through the table top and threaded into the head.

The head 356 is formed with a passage 370 which leads into a channel 372. A cap 374 rests in the channel 372 and covers the passage 370. The cap 374 is formed with a passage 376 which overlies and communicates with the passage 370. A conduit 378, secured in the cap 374, serves to conduct liquid under pressure to the cylinder and to discharge spent liquid from the cylinder.

The joint between the head 356 and the cap 374 is sealed by means of a washer 380 which surrounds a short, rigid, washer confining insert tube 382. The cap 374 is pressed down firmly and evenly against the head 356 by means of screws 384. The screws 384 are threaded through the top of the table 16 and bear against the upper face of the cap 374. The screws 384 are equipped with lock nuts 386.

The upper piston 388 comprises a head member 390 which is screwed onto a reduced, threaded upper end portion 392 of the piston rod 330. A guide and wear ring 394 surrounds the lower portion of the head member 390 and is secured to said member by screws 396 which are passed through an inturned flange 398 of the ring 394.

Assembled upon the upper end of the head member 390 and impaled upon an unthreaded end portion 400 of the rod 330 are successively a lower, flexible flanged sealing washer 402, a spacing disc 404, an upper flexible flanged sealing washer 406, and a clamping disc 408. The several parts referred to are clamped together by headed screws 410 which are passed downward through the parts and threaded into the head member 390. The washers 402 and 406 are provided with metallic insert rings 412 which surround the shanks of the screws 410. The inserts are initially a little thinner than the associated washers and serve to limit the compression applied to the washers.

The flange of the upper washer 406 is upturned, and is pressed outward by a cylindrical flange of a flexible metallic ring 414. The flange of the lower washer 402 is downturned and is pressed outward by a cylindrical flange of a flexible metallic ring 416. The spring pressed, upturned flange of the washer 406 serves to confine the oil to the working chamber of the upper cylinder. The spring pressed downturned flange of the washer 402 serves to oppose admission of air to the working space of the cylinder under certain conditions which may occasionally occur during periods of shut down.

The lower cylinder 38 comprises a sleeve portion 418 (Figures 12, 13 and 15) which is threaded at its lower end into a head portion 420. A plate 422 loosely surrounds the sleeve portion 418 and is drawn toward the head portion 420 by screws 424. The plate presses against a sealing gasket 426 which occupies a channel formed between the sleeve and body portions.

A block 428, secured to the head 420 by screws 430, has secured within it one end of a conduit 432 through which liquid under pressure is delivered to the working chamber of the cylinder 38 and spent liquid is discharged from said chamber. The conduit 432 communicates with the cylinder through aligned passages 434 and 436 formed in the block 428 and in the head 420.

The cylinder 38 is supported from the table through a structure which comprises pendent rods 438, see Figures 8 and 9 also. Each rod 438 has a reduced, threaded upper end portion 440 which is screwed into a portion of the table 16. A block 442 bears against the lower ends of the rods 438, being clamped to the rods by screws 444 which are passed upward through the block and threaded into the lower ends of the rods. The screw shanks extend through bores 446 of the block, which bores have considerably larger diameters than said shanks. A set of three screws 448, equiangularly disposed, is associated with each bore 446. The screws of each set are threaded through the block to extend radially into the associated bore 446. The oversize construction of the bores is provided in order to obviate close manufacturing tolerances. When the parts are assembled, the screws 448 are adjusted to the associated screw shank in a defined position, not necessarily concentric with the bore.

The sleeve 418 extends through the block 442, and is provided with an upwardly facing shoulder 450 which abuts an opposing shoulder of the block. The sleeve is drawn relative to the block to press the shoulders firmly together by rings 452 and 454 and screws 456. The ring 452 is a split ring which is lodged in a circumferential channel 458 of the sleeve. The screws 456 are passed upward through the ring 454 and threaded into the block 442.

The lower piston 460 comprises a hollow head member 462. The piston rod 344 is formed with a reduced threaded end portion 464 which is passed downward through the center of the head 462. Below the head there are impaled upon the piston rod portion 464 a flanged sealing washer 466 and a clamping disc 468. The washer surrounds a rod portion 470 of intermediate diameter while the disc 468 surrounds the smaller threaded portion 464 and bears upward against a shoulder formed at the junction of the portions 464 and 470. The disc 468 is pressed firmly up against the shoulder by a nut 472 which is threaded onto the lower end of the reduced portion 464. Rod portion 470 is made to protrude beyond the head 462 by an amount which is slightly less than the thickness of the washer 466, and serves to limit the compression of the washer 466 by limiting upward movement of the disc 468.

The full diameter portion of the piston rod 344 is provided with a circumferential groove 474 in which a sealing ring 476 is lodged.

In practical operation there will inevitably be some seepage of oil past the piston 460 of the upper cylinder (Figure 11). An annular drip pan 475 is provided at the lower end of the sleeve 354. The drip pan is secured to the sleeve by a band 477 which extends around the sleeve and pan and overlaps them. The band 477 includes pins 479 which fit into bores formed in the circumference of the pan. The band is provided with perforated ears 481 at its opposite ends. A bolt 483 has its shank passed through the ears 481. A clamping nut 485 threaded on the bolt holds the parts assembled and draws the ears toward one another to clamp the band firmly on the sleeve and pan.

The pan has a drain opening 487 formed at one side (see Figure 14 also) through which the collected oil flows. A guide plate 489 located below the opening 487 directs the oil into an annular trough 491 which is defined by the block 442 and the upper end of the sleeve 418 of the lower cylinder 38. The trough 491 includes a deep portion 493 which communicates through a bore 495 with a tube 497 that runs to the reservoir 494. The tube 497 is secured in a block 499 which is mounted on the block 442 by screws 501 (Figure 13).

Figure 38:
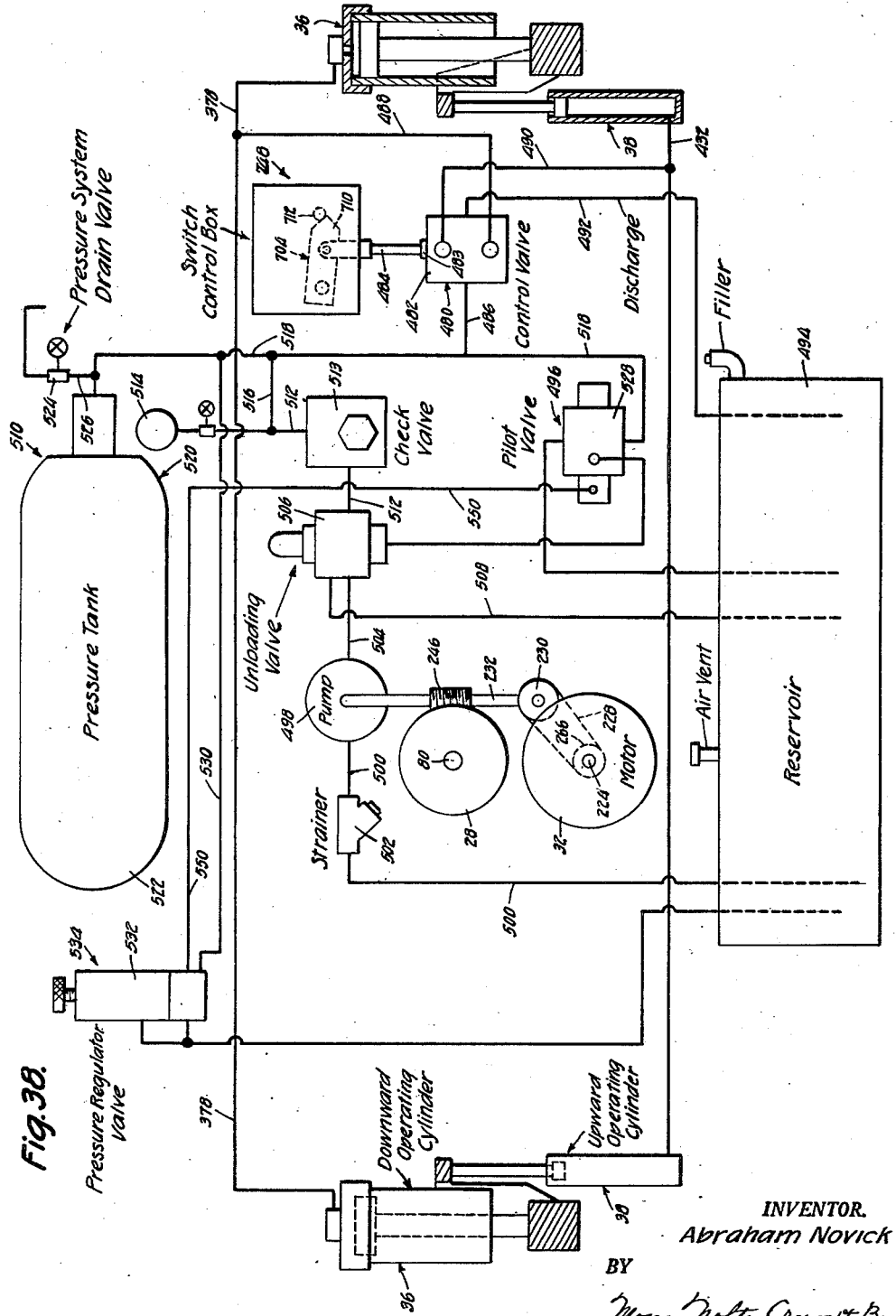
Figure 38 is a diagrammatic view showing the hydraulic system and associated parts.

The admission of oil to the upper and lower cylinders 36 and 38 and the discharge of oil from them is controlled by a valve 480 (Figure 38). The valve may desirably be in all respects the same as the corresponding valve disclosed in Serial No. 126,187, to which reference may be had for a complete disclosure. The valve 480 comprises a casing 482 and a slide valve 483 within the casing which is operated by a stem 484. The stem normally maintains the slide valve in a neutral position so that oil under pressure is not delivered either to the upper cylinders 36 or to the lower cylinders 38.

When the stem is shifted upward from the position of Figure 38, a pressure supply conduit 486 is placed in communication through the valve and through a conduit 488 with the conduit 378 which communicates with the upper cylinders 36. At the same time the conduit 432 which communicates with the lower cylinders 38 is placed in communication through a conduit 490 and the valve 480 with the discharge conduit 492 which runs to a tank or reservoir 494. These connections are maintained throughout the downward stroke of the ram.

At the conclusion of such stroke, the valve stem 484 is moved downward to reverse the connections. This causes the pressure supply conduit 486 to be placed in communication through the valve and the conduit 490 with the conduit 432 which communicates with the lower cylinders 38. It also causes the conduit 378 which communicates with the upper cylinders 36 to be placed in communication through the conduit 488 and the valve 480 with the discharge conduit 492. These connections are maintained throughout the upward stroke of the ram. At the conclusion of that stroke the valve stem 484 is restored to a neutral position in Figure 38.

The hydraulic mechanism through which the ram is lowered and raised is shown generally in a diagrammatic form in Figure 38. With the exception that a pilot valve 496 is provided, which will be described in detail at a subsequent point, and of some minor variations in the pressure regulator, the mechanism is the same as in Serial No. 126,187, to which reference may be had for a complete disclosure.

Briefly, the system comprises a pump 498, driven from the table operating motor 32 through the shaft 232, which pump draws oil through a conduit 500 (including a strainer 502) from the reservoir 494 and discharges the oil under pressure to the conduit 504. The oil is delivered by the conduit 504 to an unloading valve 506 which is constructed and controlled to cause oil delivered to it to be returned directly to the reservoir 494 through a conduit 508 whenever a predetermined pressure exists in an accumulator system 510, but to be delivered to the accumulator system whenever the pressure in the accumulator system is below such predetermined value. The accumulator system comprises a conduit 512 in which a check valve 513 is included and to which a pressure gauge 514 is applied. The conduit 512 communicates through a conduit 516 with a conduit 518 which runs in opposite directions from the conduit 516. One branch of the conduit 518 goes to an accumulator 520 which comprises a metallic casing 522 and a contained collapsible nitrogen filled bag (not shown). A manually operable pressure system drain valve 524 is provided in a branch 526 which communicates with the conduit 518.

The second branch of the conduit 518 communicates freely with the pressure supply conduit 486 that runs to the valve 480. The conduit 518 continues beyond the conduit 486 and communicates with the pilot valve 496 (see Figure 39) through a portion of the pilot valve casing 528 intermediate the ends thereof.

A branch conduit 530 runs from the conduit 518 into the casing 532 of a pressure regulator 534, communicating with the interior of the casing through a port 536. A piston 538, slidably mounted in the casing 532, is provided with a passage 540, shown in Figure 39 as placing the port 536 in communication with the left end of a bore 542 formed in the casing. The piston 538 is urged toward the left end of the bore 532 by a compression coil spring 544.

An adjustable, headed regulating screw 546 is threaded through the right hand end of the casing 532 and bears through a slide block 548 against the right hand end of the spring 544. The spring in the right end of the bore acts with regulated pressure against the pressure of the oil admitted to the left end of the bore, the pressure being determined by the setting of the screw 546. A second conduit 550 communicates with the bore 542 through a port 552 which is located a short distance to the right of the port 546. The conduit 550, at its opposite end, extends into communication with a bore 554 formed in the pilot valve casing 528, through one end of the casing. A drain conduit 556 communicates with the bore 542 of the regulator valve 534 at a point located beyond the right hand limit of movement of the piston 538. The right hand end of the bore 542 is maintained constantly in communication with a circumferential groove 558 of the piston through a bore 560 formed in the piston 538.

The pilot valve 496 includes a piston 562 which operates in the bore 554. A compression coil spring 564 bears against the pilot valve casing at the left end of the bore and in a cavity 566 formed in the left end of the piston 562 to urge the piston constantly toward the right end of the casing 528. A drain conduit 568 communicates with the bore 554 intermediate the ends of the casing 528 through a port 570. A further conduit 572 communicates with the bore 554 through a port 574 which is located a short distance to the left of the port 570.

The upper end of the conduit 572 enters the lower end of the casing 576 of the unloading valve 506 and communicates with the lower end of a small bore 578 which is formed therein. A small piston 580 is mounted to slide in the bore 578. The bore 578 communicates with a larger bore 582 in which a larger piston 584 is slidably received. The piston 584 is formed with a circumferential channel 586 of substantial width which divides upper and lower head portions 588 and 590 from one another. The conduits 504 and 512 always communicate with one another through channel 586.

A compression coil spring 592 disposed in the upper end of the bore 582 bears against the upper end of the piston 584 to urge it downward. The conduit 508 communicates with the bore 582 at a point substantially above the conduits 504 and 512. As seen in Figure 39, the upper head 588 cuts off communication of the conduit 508 with the conduits 504 and 512. The upper end of the bore 582 is maintained constantly in communication with the drain conduit 508 through a passage 596 formed in the casing 576. The upper end of the bore 582 is also maintained constantly in communication with the lower end of the bore by means of a passage 592 through the piston 584. Oil that seeps past the smaller piston 580 is thus deprived of its pressure and prevented from accumulating.

The operation of the described mechanism may be explained by assuming that a known maximum accumulator pressure is desired, so that reference may be had to the pressure indicator 514 for determining when the desired pressure is attained. The accumulator screw is first set far enough to the right to make sure that the desired pressure cannot be obtained after an operating cycle. Under these circumstances only a moderate pressure in the conduit 518 will be required to force the piston 538 of the regulator 534 from the position illustrated in Figure 39 to that illustrated in Figure 40. In the latter position, the circumferential groove or channel 558, formed in the piston 538, places the ports 536 and 552 in communication with one another so that oil under pressure is transmitted from conduit 530 through the channel 558 to the conduit 550 and thence to the right end of the bore 534 of the pilot valve.

The oil pressure thus applied to the piston 562 immediately forces it from its right hand limit of movement as illustrated in Figure 39 to its left hand limit as illustrated in Figure 40. This places the conduit 518 in communication with the conduit 572 through a circumferential channel 600 formed in the piston 562.

Oil admitted under pressure to the conduit 572 is transmitted to the lower end of the small bore 578 of the unloading valve. This forces the small piston 580 upward into contact with the large piston 584, causing it to thrust the large piston to its upper limit of movement as shown in Figure 40. When this condition is obtained, the conduits 504 and 512 are caused to communicate freely with the discharge conduit 508. The pump output is all delivered thereafter directly to the discharge conduit, and no oil is forced past the check valve 513 in the accumulator system. The check valve, however, traps in the accumulator system any oil that has already passed the check valve. Under these circumstances the pressure in the accumulator system is caused to stand at the value characteristic of the position in which the regulator screw has been set. By gradually adjusting the regulator screw 546 to put more and more pressure on the spring 544, the pressure in the accumulator system can be gradually increased until the desired pressure is indicated by the gauge 514.

When an operating cycle of the press is initiated, the oil pours from the accumulator system into the upper cylinders through the valve 480. The pump is incapable of supplying oil at the desired operating rate, and the deficiency is made up by discharging oil which has been stored in the accumulator. This causes a rapid pressure drop in the accumulator system. When the pressure drops, the piston 538 shifts leftward breaking the connection between conduits 530 and 550 and placing the conduit 550 in communication with the drain conduit 556 through the valve groove 558 and the valve passage 560.

As soon as the conduit 550 is placed in communication with the drain conduit 556, pressure in the conduit 550 drops so that the valve 562 of pilot valve is restored to its right hand limit of movement as illustrated in Figure 39. Such restoration cuts off communication of the conduit 572 with the conduit 518 and places the conduit 572 in communication with the drain conduit 568. This, in turn, causes the spring 592 to return the piston 584 to its lower limit of movement so that communication of the conduits 504 and 512 with the conduit 508 is cut off.

The pump then resumes delivery of oil to the accumulator system through the conduit 512, and continues to deliver oil to said system throughout the operating cycle and after the completion of the operating cycle until the predetermined pressure for which the regulator screw 546 is set has been reattained.

The described mechanism differs from the mechanism of Serial No. 126,187 primarily in the fact that the pilot valve is here interposed between the regulator and the unloading valve. If the pilot valve of Figure 39 were omitted, the end of conduit 518 which runs into the pilot valve were closed off, and the conduit 550 were connected directly to the unloading valve in place of the conduit 572, the structure would be broadly substantially identical with that of Serial No. 126,187. With that arrangement, however, there is a tendency of the unloading valve to hunt and chatter which is obviated by the inclusion of the pilot valve in the present arrangement. This is believed to result from the fact that the oil which controls the unloading valve is under substantially the full accumulator pressure, not being subjected to a reducing valve action in the regulator, as in the prior construction.

In Serial No. 126,187 front and rear equalizers for the ram are provided. The front equalizer compels the front edge of the ram to maintain a horizontal attitude at all times while the rear equalizer compels the rear edge of the ram to maintain a horizontal attitude at all times. Front and rear equalizers for the same purpose are provided in the present machine but the construction has been simplified and made more rugged and effective.

In Serial No. 126,187 the operating pistons extended up through opposite sides of the table to connect directly to the ram at its opposite sides and midway between the front and rear edges of the ram, and four corner rods were provided whose sole function was to effect equalization and guiding.

In the present machine, the ram drive is transmitted through the four corner rods 302, and these same rods are utilized for effecting both lateral and longitudinal equalization. As has already been described, the rods 302 at each side of the machine are rigidly connected at their lower ends to one another, and to the operating pistons, through a massive connecting block 308, so that the guided rods together with the block and the ram form a rigid rectangle strongly resistant to fore and aft distortion. Provision is further made of equalizing connections between the front pair of rods 302 and the rear pair of rods 302. These front and rear equalizer connections are alike, and hence a description of one will suffice for both.

A cross shaft 602 (Figures 4, 5, 8 and 9) having gears 604 formed at its opposite ends is mounted in bearings 606 which are secured by screws 608 to the bosses 341 formed on the sleeves 304. Each connecting block 308 has rigidly secured to it at each end an upwardly extending rack 610 for meshing with the corresponding gear 604. Each rack runs in a vertically extending channel guide 612 carried by and secured to the associated sleeve 304, the guide being formed of wear resisting metal which is harder than the sleeve.

In order that the racks 610 may be individually adjusted to mesh properly with the gears 604, provision is made for adjustably mounting them upon the blocks 308 by which they are carried. Each end of each block 308 is formed with a transverse channel 614 (Figures 4 and 8) in which there is secured a block 616 having an inclined rib 618. The rack 610 is attached to the block 308 by headed screws 620 which are passed through short vertical slots 622 formed in the rack. The rack 610 is formed in its rear face with a cross channel 624 for receiving the inclined ribs 618 and wedges 626 and 628 which are driven into the channel at opposite sides of the rib. The wedges 626 and 628 are made thick enough so that they will be clamped firmly against the block 308 by the rack when the screws 620 are tightened.

The parts are first loosely assembled with the rack in proper mesh with the associated gear. The wedges 626 and 628 are then driven firmly into place to secure the adjustment, and the screws 620 are then turned tightly into place. If readjustment is required, the screws 620 are partially backed out. The wedge located in position to resist the desired adjustment is then driven back, and the other wedge is driven farther in until the desired new position of the rack 610 relative to the block 308 is secured. The backed out wedge is then driven into clamping position and the screws 620 are retightened.

While the front and rear equalizer mechanisms, as stated, are duplicates of one another, the rear equalizer shaft 602 alone has brakes 630 (Figures 6 and 7) applied to it, to friction load the head against the hydraulic action, i. e. to pre-load it so that the hydraulic action pushes against a resistance which gives a smooth action of the head all the way down and also a smooth reversal. Without the friction load the head would have a tendency to fall faster than the hydraulic pressure would drive it. Then, when the head meets with a resistance, such as landing on top of the die, it would hesitate until the pressure catches up with it. This results in a bump. The same thing happens at the bottom end of the stroke, when running without paper or under a very light cut. Under those conditions, it comes down faster under its own weight than it is being driven and then the pressure catches up with it and that results in a bump on the reverse. Two brakes 630 are applied to the rear equalizer shaft 602, respectively adjacent the opposite ends of the shaft. The brakes are duplicates of one another so that a description of one will suffice for both. Each brake comprises two shoes 632 and 634. The shoe 632 comprises a band 636 and a lining 638, while the shoe 634 comprises a band 640 and a lining 642. The band 632 is formed with an extension arm 644 through which it is connected to an inner face of a rear flange 646 of the table 16 by means of a screw 648.

A headed screw 650 is passed through the band 640 and threaded into the band 636, holding the bands together with freedom for relative rocking movement. The shoes embrace the shaft 602 and at the side opposite the screw 650 are held together and yieldingly pressed toward one another. A headed bolt 652 surrounded adjacent its head by a compression coil spring 654, has its shank passed through the bands 640 and 636. A nut 656 threaded on the protruding end of the screw 652 bears against the band 636 in opposition to the spring 654. The brake pressure may be adjusted by adjusting the nut 656.

The brakes 630 are constantly applied, but, since they are required only to prevent gravity descent of the ram, they may be applied with a relatively light pressure so that excessive resistance to the hydraulic mechanism will be avoided and brake wear will not be excessive.

The mechanism for controlling and coordinating the operations of the cutting board 18 and the ram 20 will be described principally by reference to diagrammatic Figure 41. Under operating conditions, a line switch 660 is closed to connect line conductors 662 and 664 respectively to main conductors 666 and 668. Branch conductors 670 and 672 run to the motor 32 from the conductors 666 and 668, being controlled by an interposed switch 674 which is normally closed.

To initiate a normal cycle of operation, the switch handle 34 is actuated to close a switch 676. This closes a circuit which may be traced from conductor 666 through a conductor 678, switch 676, conductor 680, solenoid 268, conductor 682, a double throwswitch 684 which is shown in its down position, and conductor 686 back to conductor 668. The energization of the solenoid 268, as has been explained, initiates a half revolution operation of the shaft 80 to produce an inward stroke of the cutting board 18.

The shaft 80, it will be remembered, drives the crank 76 through which motion is transmitted to the cutting board. The crank 76 includes a side arm 686 which carries a cam 688 at its outer end. When the cam 688 is nearing the end of a half revolution and is about to come to rest, it engages a cam follower 690 which is carried by a thrust rod 692. The thrust rod 692 bears at its free end against a crank 694 fast on a shaft 696. A spring 699 biases the crank 694 and the shaft 696 in a clockwise direction (as viewed in Figure 41).

A forked arm 695 on the shaft 696 engages the actuating member 697 of the switch 684 to throw the switch to its upper position, a condition which must be established as a condition precedent to the subsequent initiation of the outward movement of the cutting board.

A crank 698 (Figures 34 and 36) rigidly connected to the shaft 696 carries a triangular lever or pawl 700 which is carried upward the shaft is turned counterclockwise (Figure 34) in response to the action of the cam 688 of crank 76 (Figure 41). A block 702, made fast with an arm 704, loose on a shaft 882 which is in subalignment with the shaft 696, is formed with a shoulder 706 which stands in the path of a nose 708 formed on the triangular lever 700. The arm 704 is formed with a pointed outer end 710 which cooperates with a roller 712 carried by a lever 714 rockably mounted on a shaft 716. A spring 718 mounted on a guide link 720 acts through the link to urge the lever 714 in a clockwise direction in Figure 34.

As the point of the arm 704 is rocked counterclockwise by the pawl 700, the point 710 of the arm is carried upward past the roller 712 to be retained in an upper position by the roller. As the lever 700 is carried upward, a roller 720 carried by the triangular lever 700 is intercepted by a rod 722. After the point 710 of the arm 704 has passed the roller, the obstruction interposed by the rod 722 becomes effective to swing the nose 708 out of engagement with the shoulder 706. This enables the arm 704 subsequently to be swung down without transmitting motion through the triangular lever 700 to the shaft 696.

The upward movement of the arm 704, which has been described, is effective to pull upward the link 484 through which, as already explained, the hydraulic valve 480 is controlled. This initiates downward movement of the ram 20.

Figure 34:
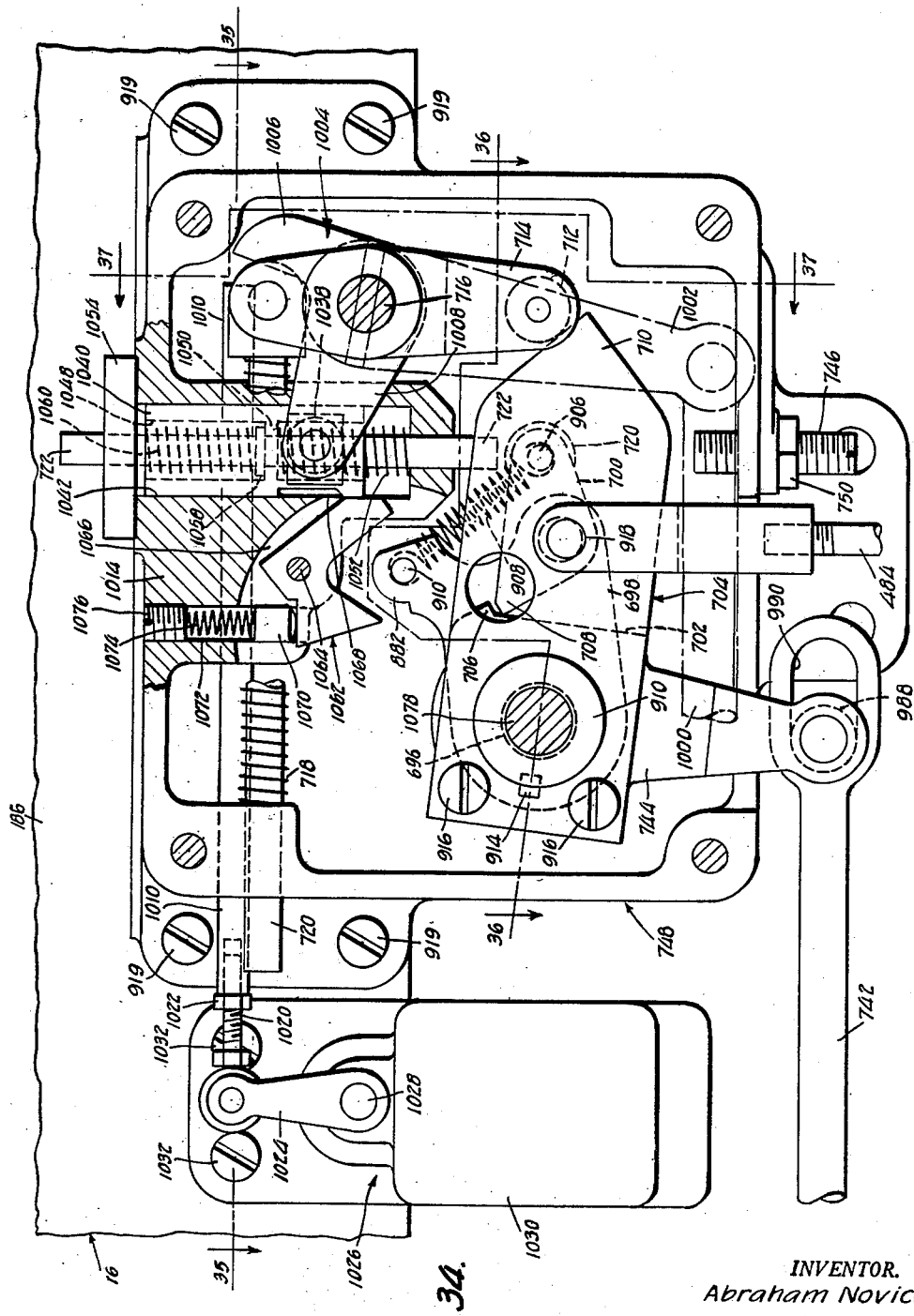
Figure 34 is a fragmentary, transverse, vertical, sectional view taken substantially on the line 34—34 of Figure 36, looking in the direction of the arrows, parts being broken away, the view showing a control box and associated parts.

As the ram nears the end of its downward movement, it acts through a cam carrying slide 724 and a cam 726 on the slide to rock counterclockwise (see Figure 28), a cam follower 728 which is carried by a rocker 729 mounted on a pin 740. The rocker 729 includes an arm 732 which, through a line 734, cranks 736 and 738 fast on a rock shaft 740, and a further link 742 (see Figures 34 and 41 also) transmits clockwise motion to the pointed arm 704 through an arm 744 rigid therewith. This causes the point 710 of the arm 704 to cross the roller 712 in a downward direction and to move the arm down beyond the neutral position in which it is illustrated in Figure 34 to its lower limit of movement. This causes the link 484 to reverse the valve 480, and thereby to reverse the direction of movement of the ram 20. The arm 704 is arrested in its lowermost position by an adjustable stop screw 746 which is threaded through a control box casing 748 and retained in adjusted position by a lock nut 750.

Shortly after the ram 20 starts up, it causes outward movement of the cutting board 18 to be initiated. During downward movement of the ram, a cam 752 on the front equalizer shaft 602 has been carried idly past a follower 754, which follower is carried on a bell crank 756. During an early part of the return stroke, however, the cam 752 rocks the bell crank 756 in a clockwise direction (see Figure 41). The bell crank 756 engages the actuator 758 of a switch 760 and, in response to the impulse imparted by the cam, causes the actuator to close the switch.

This establishes a circuit from conductor 666 through switch 760, a conductor 762, a conductor 680, solenoid 270, conductor 764, switch 684 (in its upper position) back to conductor 668. The outward movement of the cutting board 18 is thus initiated by the action of solenoid 270 upon the clutch pin 254. The switch 760 is closed only for the purpose of initiating outward movement of the cutting board. In the course of the upward ram movement, the cam 752 permits the bell crank 756 to return to its original position so that the switch 760 is restored to the open condition.

Outward movement of the table is arrested by the action of the control pin 252 of the clutch 30. The switch 684 is returned to its lower position by the action of the spring 699 as soon as the cam 688 of the arm 76 has moved out of engagement with the thrust rod 692, early in the board restoring operation.

As the ram 20 nears its upward limit of movement a cam 766 (Figure 28) carried by the slide 724 engages a follower 768 on the rocker 729 to turn the rocker in a clockwise direction. This motion is transmitted through the train of mechanism previously described to impart counterclockwise motion to the arm 704. Such motion restores the arm 704 in its original, neutral position (Figures 34 and 41), cutting off all delivery of oil by the accumulator system. This causes the ram to come to rest in its normal, idle position at its upward limit of movement.

Restoration of the arm 704 to neutral has the incidental effect of permitting the triangular lever 700 to return to its original position, as illustrated in Figure 34. This completes the normal operating cycle. The board 18 and ram 20 have both been brought to rest in their original positions and all of the control mechanism has been restored to its original condition. In the foregoing outline of operation many details have been passed over. These will now be described.

The switch 676 comprises a casing 770 (Figures 28 and 29) upon which the actuating handle 34 is pivotally mounted. The switch is of a well known type and is actuated by the handle 34 in conventional manner. The switch casing 770 is mounted upon the ram head 300 in conveniently accessible position near the front of the machine.

The switch 760 comprises a casing 772 (Figures 22 and 23) which is carried by a bracket 774, the bracket, in turn, being supported from the table 16, as shown in Figure 7, at the lower side of the plate 240. An actuator shaft 776 for the switch mechanism is rockably supported on the casing 772 and has fast upon it the actuating arm 758.

The bell crank 756 comprises a forked arm 778 fast on a shaft 780 and an angularly related arm 782 mounted on the same shaft for movement in unison with the shaft about the axis thereof. It is the arm 782 that carries the cam follower 754. The shaft 780 is rockably supported in arms 784 and 786 of the bracket 774.

It will be remembered that the cam 752 passes the follower 754 idly as the ram moves downward but actuates the follower on the return stroke. In order to permit this mode of operation, the arm 782 is mounted to rock about an axis at right angles to the axis of the shaft 780.

The arm 782 is not directly mounted on the shaft 780, but is carried by a bracket 788 (Figures 24 and 25) which is fast upon the shaft. The bracket 788 comprises two parallel arms 790 and 792. A pivot pin 794 is mounted in the arms 790 and 792 in a plane at right angles to the shaft axis and projects outward beyond both of them. The arm 782 also includes spaced arms 796 and 798. These latter arms 798 straddle the block 788 and extend downward along the outer sides of the block arms 790 and 792, respectively. The arms 796 and 798 are supported for pivotal movement upon the protruding ends of the pin 794. Between the bracket arms 790 and 792 mechanism is provided for yieldingly biasing the arm 782 to an attitude at right angles to the axis of the shaft 780.

Levers 800 and 802 bear upon the pin 794 and are drawn toward one another by a tension coil spring 804, which extends into bores of the levers, and is connected to the respective levers at its opposite end. A fixed pin 806 is mounted in the bracket 788, and constitutes a limit stop for limiting movement of the right hand lever 802 (Figure 24) toward the left and movement of the left hand lever 800 toward the right. A pin 808 is mounted in the arms 796 and 798 and also extends between the levers 800 and 802. The pin 808 is free to move relative to the bracket 788, being passed through slots 810 which are formed in the arms 790 and 792.

When the arm 782 is rocked counterclockwise (Figure 24) the pin 808 pushes the lever 800 before it, but the lever 802, being obstructed by the pin 806, is not free to follow. The tension of the spring 804 is accordingly increased and when the displacing force applied to the arm 782 is withdrawn, the spring restores the arm to its normal central position. When the arm 782 is rocked in the opposite direction from normal, the action is similar, but this time the lever 802 is displaced toward the right by the pin 806 and the lever 800 is restrained by the pin 808.

The cam 752 is supported and frictionally driven from the shaft 602 by a friction ring 812 (Figures 4, 7, 22 and 23). The ring 812 is a brake-like structure which comprises two shoes pivotally joined through a pin 814. Each shoe comprises a generally semi-circular band 816 and a lining 818. The linings are disposed in a groove 820 of a collar 821 fast on the shaft 602, being confined against axial movement by the sides of the groove. The bands are formed with opposed ears 822. A pin 824, fixed in one of the ears passes freely through the other ear and is surrounded by a compression coil spring 826. The spring is pressed against the second ear by a pressure adjusting nut 828, which nut is retained in adjusted position by a lock nut 830.

The arm 786 of bracket 774 is formed with an extended portion 832 in which an arcuate slot 834, concentric with the shaft 602, is provided. The pivot pin 814 extends at one of its ends beyond the lateral bounds of the friction ring 812, and plays in the slot 834. The ends of the slot 834 stand in obstructing relation to the pin 814 and serve as stops for limiting the range of movement of the cam 752. The described frictional drive for the cam 752, together with the provision of limit stops, assures that the cam will be driven through the same range and will be timed uniformly in its active stroke, notwithstanding variations in the set upper and lower limits of ram movement.

The cam 752 is mounted on a seat 846 (Figures 22 and 23) which is provided on one of the bands 816, being secured to the band by screw 838. The cam 752 includes two members 840 and 842. The member 840 is for rocking the follower 754 aside and holding it out of line with the cam member 842 as the shaft 602 turns clockwise (Figure 23) during the descent of the ram, but for permitting it to be actuated by the cam member 842 during the return stroke of the shaft 602.

As the cam moves clockwise (Figure 23), a leading end portion 844 of the cam member 840 which extends obliquely to the direction of rotation, engages the follower 754 and pushes it sidewise, causing it to be carried by a rocking movement of the arm 782 away from alignment with the cam member 842. A following dwell portion 846 of the cam member 840 holds the follower displaced until the cam member 842 has moved completely past it. At that point, the follower is released by the cam portion 846 and snaps back to alignment with the cam member 842.

Substantially at the beginning of the return stroke, the follower 754 is engaged by the cam member 842 and caused to ride onto it, and thus to rock the bell crank 756 clockwise (Figure 23), causing the switch 760 to close against the resistance of a return spring (not shown) within the switch casing. The switch 760 is only required to be held closed for a short time. The contour of the cam member 842 allows it to return to an open position at an early point in the return stroke of the cam member. During the return stroke, the face of the cam portion 844 which is toward the observer in Figure 23 encounters the follower 754, but because of the rockable mounting of the arm 782 the follower is merely pushed aside and is later permitted to snap back to the normal position illustrated in Figure 22 after the cam portion 844 moves clear of it.

As the switch 760 is restored to open condition by its return spring, the arm 778 is swung into engagement with an adjustable stop screw 848 which is threaded into the plate 240 and held in its adjusted position by a lock nut 849. The screw 848 determines the normal position of the bell crank 756.

Figure 6:
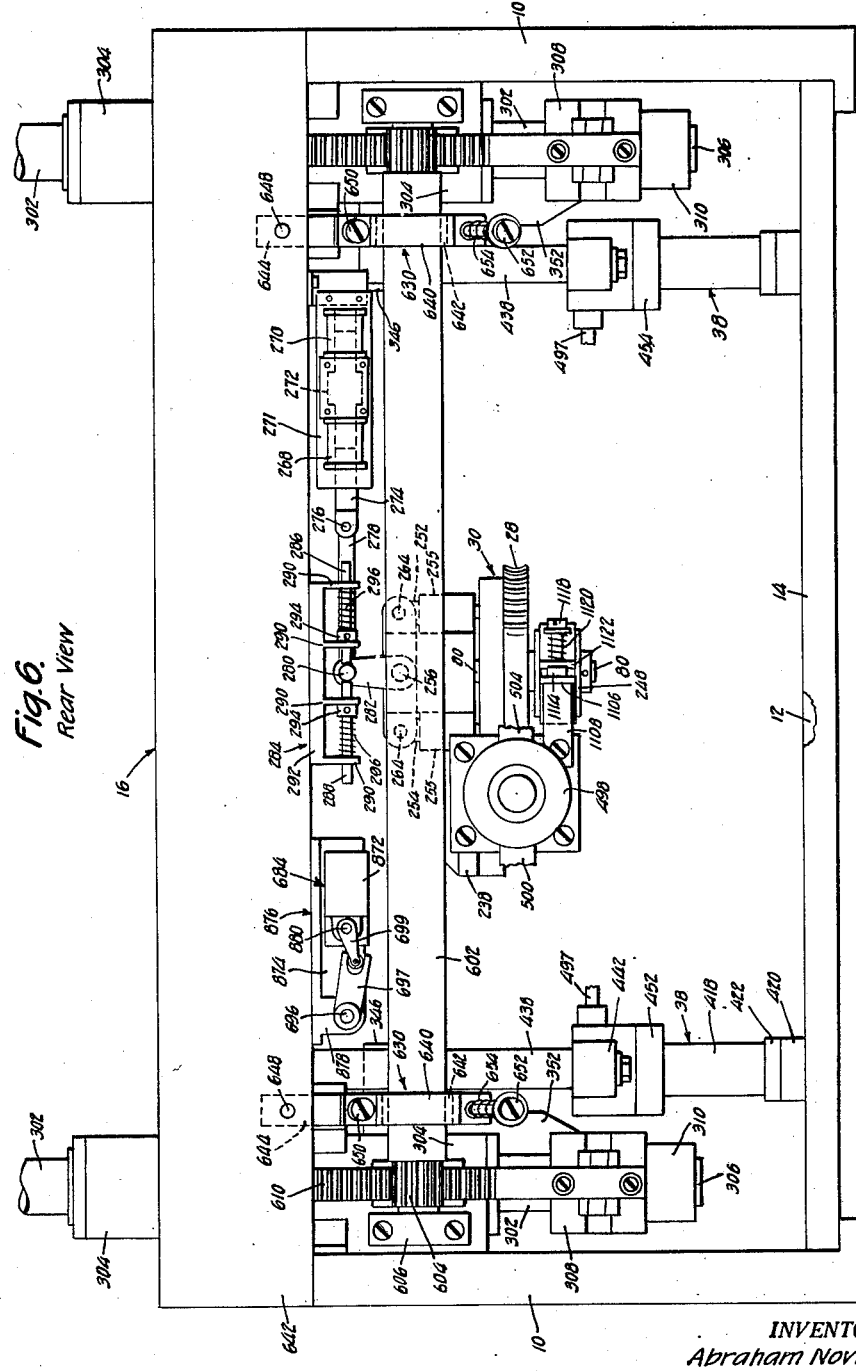
Figure 6 is a fragmentary view in rear elevation of the machine with some of the parts omitted.
Figure 26:
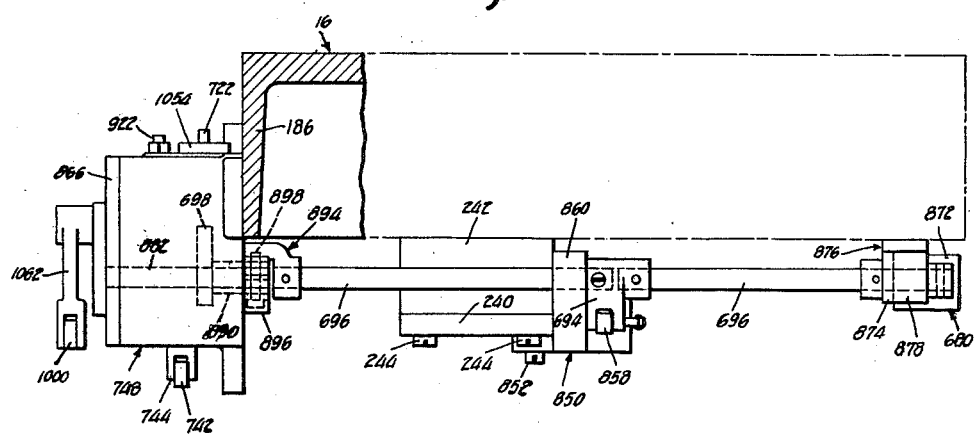
Figure 26 is a fragmentary, longitudinal, vertical, sectional view taken on the line 26—26 of Figure 27, looking in the direction of the arrows.
Figure 27:
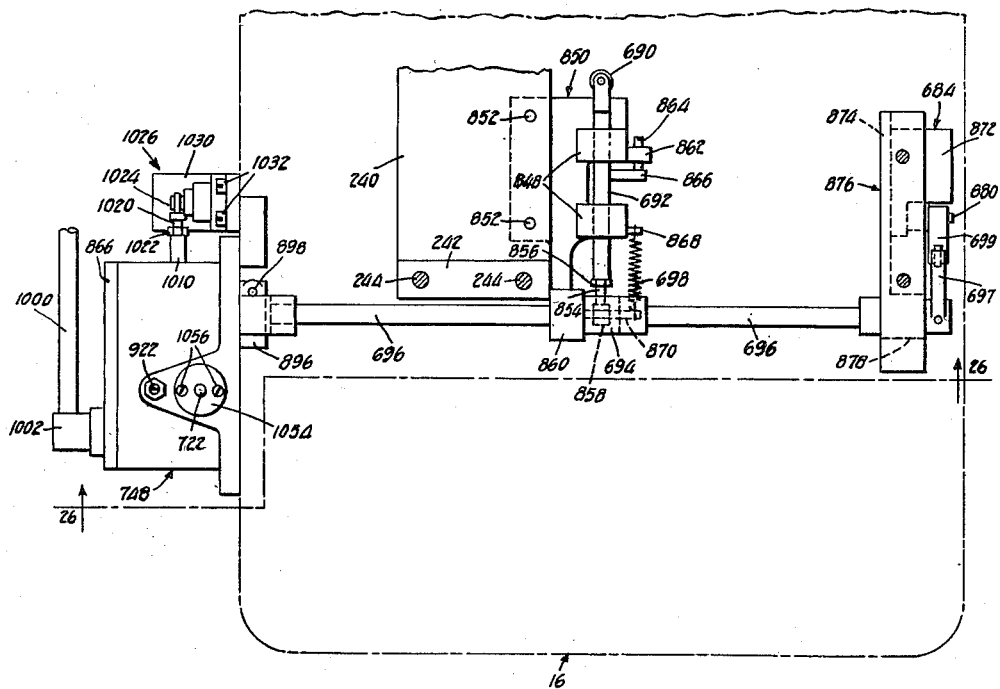
Figure 27 is a horizontal view of the parts shown in Figure 26, the table being shown in dot and dash lines.

Details of the shaft 696 and associated parts, shown in Figure 41, are illustrated in Figures 6, 26 and 27. The shaft 696 comprises aligned sections. The arm 694, which coacts with the thrust rod 692, is made fast upon the abutting ends of the sections and joins them to one another as shown in Figure 20.

The thrust rod 692 is slidably mounted in ears or lugs 848 formed on a bracket 850 (Figures 26 and 27). The bracket 850 is secured upon the lower face of the plate 240 by screws 852. The thrust rod 692 is rectangular in cross section and operates in rectangular openings formed in the ears 848, by which it is prevented from turning. A threaded rod 854 is screwed into the end of the rod 692 remote from the follower 690, and is secured in adjusted position by a lock nut 856 to maintain a desired effective length. The threaded rod 854 bears at its free end against a roller 858 on the arm 694.

The bracket 850 is formed with a bearing arm 860 which rockably supports the shaft 696. One of the ears 850 includes an extension 862 through which an adjustable stop screw 864 is threaded. The screw 864 cooperates with a pin 866 carried by the thrust rod 692 to limit movement of the follower 690 into the path of the cam 688. The spring 698 which biases the shaft 696 in a clockwise direction as viewed in Figure 41, is secured at one end to a pin 868 (Figures 26 and 27), on one of the ears 848 and at the other end to a pin 870 which is carried by the arm 694 and upon which the roller 858 is mounted.

The switch 684 which determines the direction of movement of the table, shown diagrammatically in Figure 41, comprises a casing 872 (Figures 6, 26 and 27) which is secured upon a vertical flange 874 of an angle bracket 876, which bracket is affixed to the lower side of the table 16. The rear end of the shaft 696 is supported in a bearing portion 878 of the bracket 876. The rear extremity of the shaft 696 is mounted in a bearing 878, and has affixed to it the forked arm 697 through which the switch 684 is operated. The switch actuating arm 699 which is responsive to the arm 697 is made fast upon a switch actuating shaft 880 carried by the casing 872.

The control mechanism associated with the forward end of the shaft 696 is housed in the control box 748. A stationary shaft 882 (Figures 26, 34, 35 and 36) is carried by and within the control box 748 in axial alignment with the shaft 696. One end of the shaft 882 is mounted in a box 884 of a plate 886 which forms one wall of the control box, being secured therein by a set screw 888. The opposite end of the shaft 882 extends into a hub 890 of the crank 698. The hub 890 has bearing in the opposite wall 892 of the control box and extends rearward beyond said wall. A coupling 894 (Figures 26, 27 and 37), pinned to the shaft 696, includes a split collar 896 which is clamped on the hub 890 by a screw 898 to cause the crank 698 to be operatively connected to the shaft 696.

The triangular lever 700 is pivotally supported on the crank 698 by means of a headed pivot bolt 900 (Figures 34 and 36). The body of the bolt forms the support for the lever 700, while the shank 901 is passed through the crank 698 and held to it by a nut 902. A shouldered pin 904 (Figure 37) is riveted into the triangular lever 700 and forms a bearing support for the roller 720 with the rod 722. A cotter pin 906 is passed through the pin 904 to retain the roller 720 in place upon the pin. A tension coil spring 908 is secured at one end to the pin 906 and at its opposite end to a pin 910 carried by the crank 698, for urging the triangular lever 700 in a clockwise direction (Figure 34).

The block 702, which is mounted with freedom for rocking movement on the fixed shaft 882, has a hub portion 910 (Figures 34, 35 and 36) which extends across into engagement with control box wall 886. The arm 704 is mounted on the hub 910 against a shoulder 912 and is made fast with the arm 704 to compel the arm 704 and the block 702 to turn in unison. Headed screws 916 are passed through the arm 704 and threaded into the block 702 to secure the arm in fixed position relative to the block.

The link 484 (shown in Figure 41) has a forked upper end, illustrated in Figures 34 to 37, which embraces the arm 704. A headed pivot pin 918 is passed through the forked arm of the link 484 and through the arm 704 and is upset. The arm 744 (Figures 34 and 37) is unitary with the block 702 and is therefore constrained at all times to turn in unison with the arm 704. The control box is affixed to the flange 186 of the table 16 by screws 919.

Figure 28:
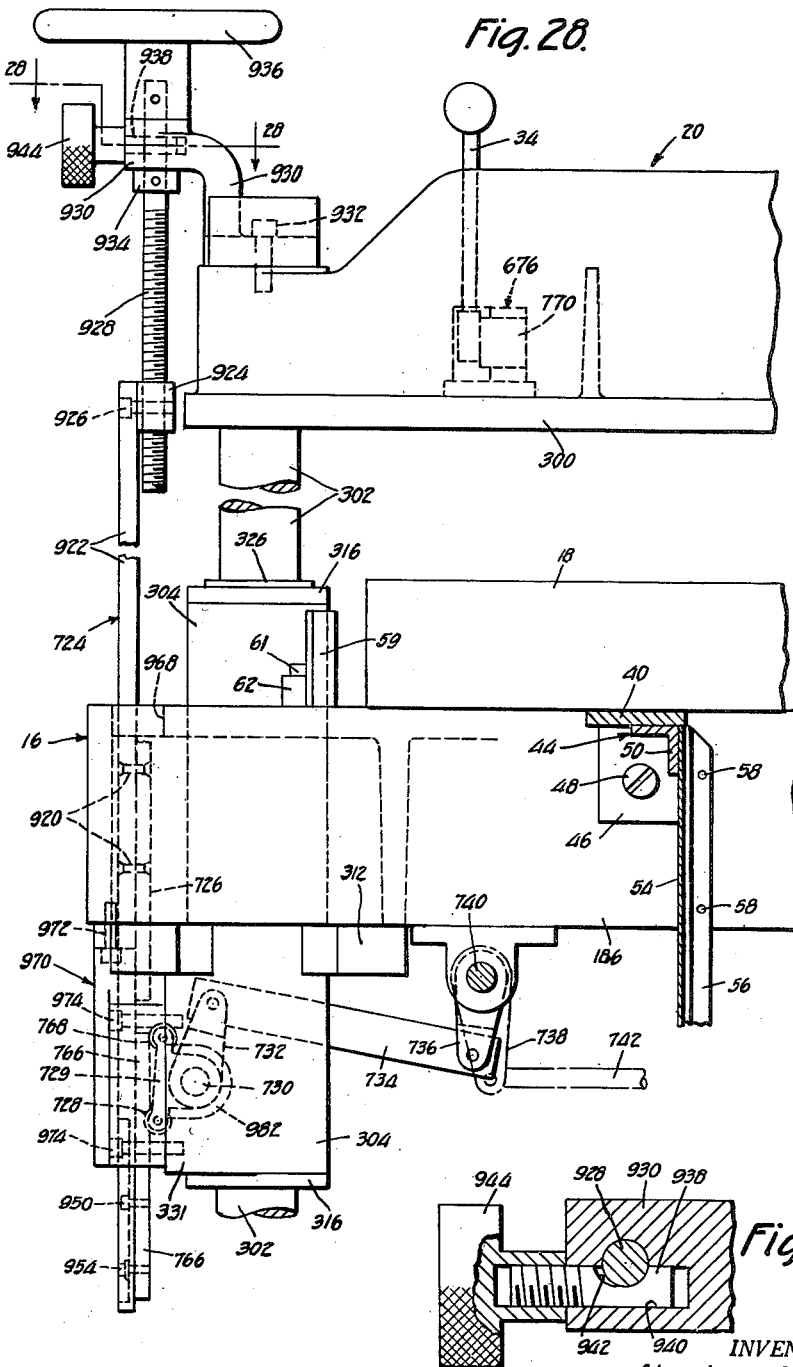
Figure 28 is a fragmentary view in front elevation showing the upper left hand portion of the machine, with the mechanism broken away intermediate its height for compactness of illustration.
Figure 29:
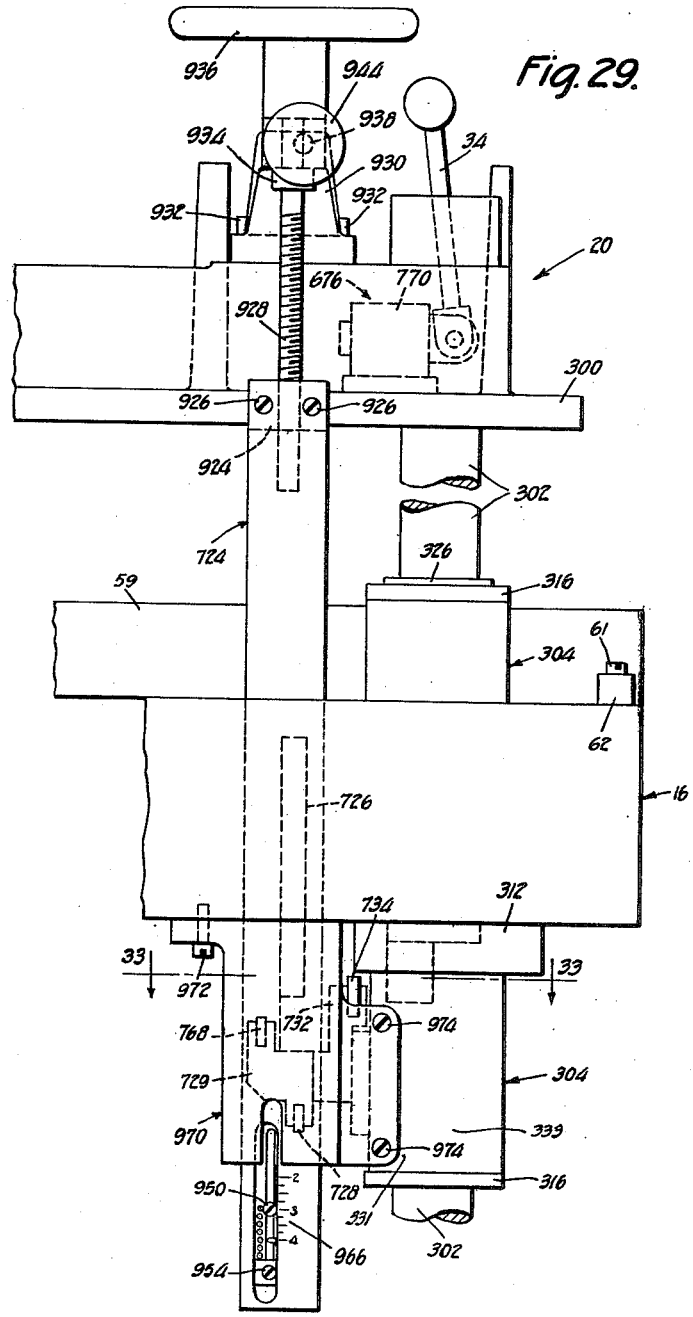
Figure 29 is a fragmentary view in side elevation showing the portion of the machine illustrated in Figure 28.

Reference has been made to the fact that the lower limit cam 726 and the upper limit cam 766 are carried by a slide 724 which is operated by, and in unison with, the ram 20. The lower limit cam 726 is fixedly secured upon the slide 724 by rivets 920 (Figures 28, 30 and 31). Since it cooperates with the follower roller 728 which is located at a fixed level, vertical adjustment of the slide relative to the ram 20 will determine the level at which the ram reverses its downward movement.

The slide 724 includes a flat rectangular bar 922, to the upper end of which a block 924 (Figures 28 and 29) is affixed by screws 926. It also includes a threaded rod 928 which is screwed into the block 924. An upper, unthreaded portion of the rod 928 is passed through a bracket 930, which bracket is secured upon the ram head 300 by screw 932. The rod 928 is confined against axial movement relative to the bracket 930 by a collar 934 which is pinned to the rod below the bracket, and the hub portion of an operating wheel 936 which is pinned to the rod above the bracket. The effective length of the slide 724 is adjusted by rotation of the wheel 936 to turn the rod 928 in the block 924.

Provision is made for locking the rod 928 against rotation when a desired adjustment has been effected. A headless screw 938 (Figure 28a) is received in a bore 940 formed in the bracket 930. The rod 928 passes upward through a notch 942 formed in one side of the screw and prevents rotation of the screw. A finger nut 944 is threaded onto a protruding end of the screw 938 and bears normally against a face of the bracket 930. Turning of the nut 944 in the direction to thread it onto the screw exerts an outward pull upon the screw 938, causing a face of the notch 942 to clamp firmly against the rod 928 and lock the rod against turning. When further adjustment is desired, the nut 944 is first backed off slightly. After the adjustment has ben made the nut is retightened.

The upper limit cam 766 (Figures 30, 31 and 32) is mounted with provision for adjustment longitudinally of the slide bar 922. Since the lower limit cam 726 is fixed on the slide bar, adjustment of the cam 766 adjusts the ram stroke, determining the height above the lower limit of movement at which the ram will normally stand at rest.

The lower end of the slide bar 922 is formed in the side toward the operator with a longitudinal recess 946. Behind the recess the slide bar 922 is provided with a slot 948 which extends lengthwise of the recess 946. A headed screw 950 has its shank passed through the slot 948 and is threaded into the cam 766, the head of the screw being normally drawn into clamping relation to the bar by engagement with the face 952 which forms the bottom of the groove. A second headed screw 954 is similarly passed through the slot 948 and threaded into the cam 766. In this instance, however, the screw shank is also passed through a small rectangular plate 956 against which the screw head bears. The plate 956 carries a rearwardly extending pin 958 which is adapted to be inserted selectively in any one of a series of bores 960 formed in the left hand section of the wall 952.

When an adjustment is to be made, the screw 950 is backed out slightly and the screw 954 is backed out sufficiently to enable the pin 958 on the plate 956 to be withdrawn from its engagement with the wall 952. The desired adjustment is then made by sliding the cam 766 along the slide bar 922 to the desired position. The plate 956 and its pin 958 move along with the cam during the adjustment. When the desired position of adjustment has been determined, the pin is inserted into one of the bores 960 and the screws 954 and 950 are then retightened.

The cam has affixed to it a pin 962 which extends forward through slot 948. The pin 962, at its forward end, carries a pointer 964 which cooperates with an adjustment scale 966, the scale being provided on the slide bar 922 along the right side of the recess 946 (Figure 30).

The slide bar 922 passes freely through an opening 968 (Figure 28) in a margin of the table 16. It is guided in a bracket 970 (Figures 28, 29 and 33) which is mounted beneath the table. The bracket is secured by a screw 972 to the table 16 from below, and is secured to the boss 331 on an adjacent sleeve 304 by screws 974. The bracket 970 is formed with a channel 976 for receiving the slide bar 922. Guide strips 978 secured to the channel walls by screws 980 overlie margins of the bar 922.

The bracket 970 includes an extension arm 982 on which the pivot pin 740 is fixedly secured. The rocker 729 by which the followers 728 and 768 are carried and of which the crank 732 is an integral part is rockably supported upon the pin 740. The pin is provided with a head 986 at its free end for retaining the rocker 729 in place.

The cams 726 and 766 are mounted on the slide bar 922 in positions to be out of vertical alignment with one another (see Figure 30). The followers 728 and 768 carried by the rocker 729 are also disposed out of vertical alignment with one another (see Figure 29), but in alignment respectively with the cams 726 and 766 (Figure 33), to be acted upon exclusively by the cams 726 and 766, respectively. The disalignment of the cams also permits the cams to be adjusted into overlapped relation without interference whenever such adjustment is desired.

In the neutral position of the parts, as illustrated in Figure 34, a cross pin 988 which forms the connection between the arm 744 and the link 742 stands at the left hand end of a slot 990 formed in the link 742. This condition naturally arises in view of the fact that the arm 704 has been operated counterclockwise to the position illustrated in response to a thrust exerted by the link 742. Because the slot 990 extends rightward from the pin 988, the arm 704 is free to be shifted upward for bringing about a downward stroke of the ram without disturbing the position of the link 742.

When the ram 704 is shifted upward to initiate a downward stroke of the ram, it is carried against an adjustable stop screw 992 (Figure 37) and bears against the stop screw until the downward ram stroke is completed. At that point, as has been described, the arm 704 is moved by the link 742 (see Figure 28 also) to its lower limit of movement where it engages the adjustable stop screw 746. The screws 746 and 992 are made adjustable for the purpose of selecting the upper and lower limits of the arm 704 and of thereby controlling the degree of opening of the valve 480 during the downward and upward strokes, respectively. This determines the rate at which liquid is delivered to the cylinders 36 and 38, respectively, and thereby provides for controlling separately the downward and upward rates of movement of the ram.

It is sometimes desirable to operate the cutting board to and from cutting position without producing any actuation of the ram. A condition requiring this mode of operation has been described in connection with the changing of the connections between the tongue 70 and the block 82 through which the cutting board is driven. For this purpose, provision is made of means alternative to the switch 676 for intiating movement of the cutting board which does not have the consequence of initiating a ram operation.

A handle 994 (Figures 4 and 41), guided loosely for sliding movement in a bracket 996 affixed to the table 16, is pivotally connected to one arm of a bell crank 998 which is mounted with freedom for rocking movement on the shaft 740. The other arm of the bell crank 998 is connected through a thrust rod 1000 to an arm 1002 fast on the shaft 716. The shaft 716 also has fast upon it a bell crank 1004 which comprises upwardly and inwardly extending arms 1006 and 1008 respectively (see Figure 34 also).

The arm 1006 stands in alignment with a thrust rod 1010. The rod 1010 is slidingly mounted in a wall 1012 of the control box casing 748 and in a lug 1014 which is integral with the control box casing. A compression coil spring 1016 surrounds the rod 1010, bearing at its left end (Figure 35) against the wall 1012 and at its right end against a collar 1018 which is fixed on the rod and which normally bears against the left side of the lug 1014.

The end of the rod 1010 remote from the arm 1006 has a headed screw 1020 threaded into it and fixed in place by a lock nut 1022. The head of the screw 1020 engages with switch operating arm 1024 of a switch 1026. The arm 1024 is made fast upon an actuating shaft 1028, which shaft is rockably mounted in the casing 1030 of the switch 1026. The casing 1030 is affixed to the table 16 by screws 1032.

When it is desired to operate the cutting board 18 rearward without producing a ram actuation, the handle 994 is forced downward, rocking the shaft 716 clockwise so that the arm 1006 is caused to thrust the rod 1010 leftward (Figure 35) for closing the contacts of the switch 1026. This closes a circuit which may be traced (Figure 41) from conductor 666, through conductor 1034, switch 1026, conductor 1036, conductor 680, solenoid 268, conductor 682, switch 684 in its down position, and conductor 686 back to conductor 668. This causes the cutting board 18, or at least the tongue 70 if the cutting board is disconnected at the moment, to be operated to its rearward limit of movement and is there arrested.

Mechanism is provided, responsive to actuation of handle 994, for avoiding the initiation of ram operation when the cutting board is put into operation by the handle. Bell crank arm 1008, fast on the shaft 716, carries at its free end a roller 1038 (Figures 34, 35 and 37) for acting upon a plunger sleeve 1040 which is mounted for reciprocation in a vertical bore 1042 formed in the lug 1014. The sleeve 1040 is formed externally with a horizontal slot 1044 in which the roller 1038 engages. The roller 1038 has access to the slot 1044 through a wider slot 1046 formed in the lug 1014, the latter slot being wide enough to accommodate operative movement of the roller 1038 without interference.

A bore 1048 of the sleeve 1040 is interrupted by a partition 1050 which extends across the bore substantially midway of its length. A compression coil spring 1052, lodged in the lower portion of the bore 1048 bears at its upper end against the partition 1050 and at its lower end against the portion of the lug 1014 at the lower end of the bore 1042. The spring 1052 normally maintains the sleeve at an upward limit of movement in the bore 1042 against a flanged plug 1054. The plug 1054 is secured over the end of the bore 1042 by screws 1056 (Figure 37) which are threaded into the lug 1014.

The rod 722, which stands in the way of the roller 720 on the triangular lever 700 and serves to rock the nose 708 free of the shoulder 706 of the block 702 after the point 710 of the arm 704 has crossed the roller 712 in the normal operation, is slidingly mounted in the sleeve 1040. The rod is guided in the partition 1050, the plug 1054 (and the lower part of the lug 1014). The rod 722 includes a flange 1058 which is located above the partition 1050. A compression coil spring 1060, which surrounds the rod 722 and is lodged in the upper portion of the bore 1048, bears at its upper end against the plug 1054 and at its lower end against the flange 1058, maintaining the flange normally pressed down in engagement with the partition 1050.

In order that the special operation of which the ram operation is suppressed may be clearly understood, it is necessary to explain in further detail just what happens in the normal operation as the arm 698 is swung counterclockwise (Figure 41). As the triangular lever 700 (Figure 34) is carried upward by the arm 698, the nose 708 engages the shoulder 706 of the block 702 and moves the pointed arm 704 far enough to cause the snap-over action to occur at the point 710 of the arm, all as previously explained. Shortly after the triangular lever 700 begins to rise, the roller 702 on the lever engages the plunger rod 722, causing the plunger rod to compress the spring 1060 while the triangular lever 700 continues its upward movement. Right up to the instant of the snap-over action, the lever 700 has an appreciable amount of work to do in compelling the arm 704 to rock counterclockwise against the resistance of the spring 718 which acts upon the lever 714. As soon, however, as the crank 710 of the arm 704 crosses the roller 712, shoulder 706 runs away from the nose 708. This relieves the frictional contact which has been maintained between the shoulder and the nose so that the energy stored in the compression spring 1060 acts to thrust the rod 722 downward and snap the nose 708 clear of the shoulder 706.

In the special operation now under consideration, however, in which the cutting board is operated without setting the ram into operation, the triangular lever 700 whose nose 708 in the normal condition of the parts is out of engagement with the shoulder, is rocked to carry the nose clear of the shoulder before any rocking of the arm 698 occurs. This is accomplished through the sleeve 1040 and the plunger rod 722.

The rocking of the shaft 716 induced by the handle 994 is applied through the arm 1008 to thrust the sleeve 1040 downward against the resistance of the spring 1052. The spring 1060 causes the plunger 722 to follow the sleeve 1040 downward and to engage the roller 720, thrusting it down far enough to rock the nose 708 clear of the shoulder 706. The force exerted by the spring 1060 is relatively light under these conditions, but there is no frictional force resisting the swinging of the nose at this time, and the force exerted by the spring 1060 is adequate to overcome the force of the pawl return spring 908. When, therefore, the cam 688 acts at the conclusion of the inward movement of the cutting board to rock the crank 698 counterclockwise (Figure 34), the nose 708 of the pawl has already been swung clear of the shoulder 706 to break the connection from the arm 698 to the arm 704. No movement of the arm 704 and its connected link 484 results. The valve 480, therefore, remains closed, and the ram remains at rest.

In order to relieve the operator of the necessity for holding the handle 994 down for any prescribed length of time, provision is made for latching the sleeve 1040 in its depressed position. Latching the sleeve down obviates the possibility of the nose 708 being permitted to return to operative relation with the shoulder 706 in time to produce an unwanted actuation of the arm 704. A latch 1062, pivotally mounted on a pin 1064 carried by the lug 1014, and operating in a slot 1066 formed in the lug, has a nose portion which becomes automatically engaged with a notch 1068 of the sleeve 1040, to latch the sleeve down when the sleeve is depressed by the arm 1008.

A plunger pin 1070, slidably mounted in a bore 1072 of the lug 1014 is thrust downward against the tail portion of the latch 1062 by compression coil spring 1074 which is lodged in the bore, and an abutment plug 1076 which is threaded into the upper end of the bore. The latch 1062, thus made effective to hold the pawl 700 out of operation, is maintained effective as the crank 698 moves upward. As the crank 698 nears the upper limit of its movement, however, and after the nose 708 has been carried upward beyond possible engagement with shoulder 706, an upwardly projecting portion 1078 of the crank 698 engages the latch tail and rocks the latch clear of the sleeve notch 1068, thus permitting the sleeve 1040 to spring upward.

When the cutting board has been operated rearward as described without setting the ram into motion, and has come to rest, it is necessary for the operator to initiate the return movement of the board. This is done by a second actuation of the handle 994. This again closes the switch 1026. The circuit thus established, as before, may be traced from conductor 666, through conductor 1034, switch 1026, and conductor 1036 to conductor 680. At this point, however, the current instead of going through solenoid 268 goes through solenoid 270, because the switch 684 is now in its up position. From the solenoid 270 the circuit is continued through conductor 764, and switch 684 in its up position, back to conductor 668. This causes the board 18 to be returned to its forward position.

The second actuation of the handle 994, like the first, has the effect of swinging the arm 1008 of bell crank 1004 downward and of depressing the sleeve 1070. This is an idle movement, however, because the latch is at this time held inoperative by the portion 1078 of the crank 698, the crank being at its upper limit of movement. As soon, therefore, as the handle 994 is released, the sleeve returns to its upper position. The nose 708 of the pawl 700 can be returned automatically to its normal position, therefore, when the arm 698 is returned to its normal position. This will occur as soon as the cam 688 moves clear of the follower 690, to wit, shortly after the outward movement of the board begins.

The handle 994 also serves as a safety handle. If the operator, after operating the switch 676 to start a normal cycle of operations notices some reason why the cycle may not safely be carried through, he can still suppress the operation of the ram by quickly actuating the handle 994. This has no effect upon the cutting board movement, but it does disable the pawl 700 in the manner which has been described. The cutting board, upon completing its inward movement therefor, will come to rest without having set the ram in operation. The cutting board can then be returned to its outer position by a second actuation of the handle 994, as already explained.

There are times when it is desirable to operate the ram 20 in an upward direction independently of the status of the cutting board 18 in its cycle. For example, the operator, after a period of shut down, and despite precautions to the contrary which have been described, may find when he is ready to resume work that the ram has descended by gravity to its lowermost position, or at least to an intermediate position. In either case the ram is in a mistimed relation to the cutting board, making it desirable to return the ram to its uppermost position without disturbing the normal, idle condition of the cutting board and its control mechanism.

Again, if the ram is stalled in its downward movement (as when it comes down upon an accidentally inverted die upon the stack) it becomes necessary first to return the ram to its uppermost position, and then to return the cutting board to its forward position independently of the ram if it has not been automatically returned as an incident of the restoration of the ram.

Still again, if the operator should notice that the die is inverted or that there is some other obstruction after the ram has started downward in a normal cycle, he will wish to reverse the ram before it engages the die or the other obstruction and send it back to its uppermost position.

Figure 4:
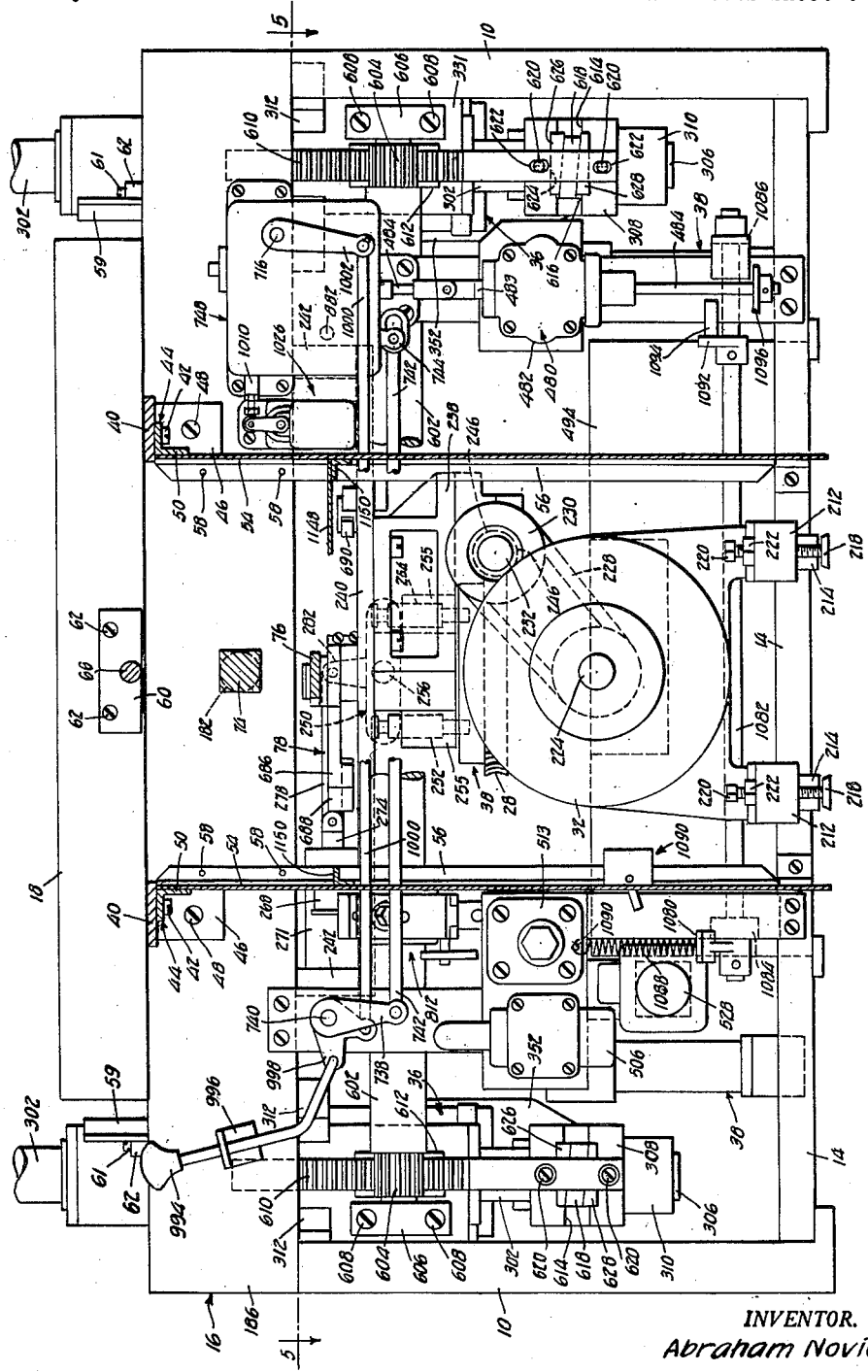
Figure 4 is a fragmentary transverse sectional front elevation, the section being taken upon the line 4—4 of Figure 1, looking in the direction of the arrows, some of the parts being omitted.

For the purpose of meeting these contingencies, provision is made of mechanism operable at any time when the ram is displaced from its uppermost position to return it to that position. This mechanism is best illustrated in Figures 4 and 5.

A treadle 1080 is fixed to a rock shaft 1082, which shaft is rockably supported in fixed bearings 1084 and 1086. A tension coil spring 1088 connected to the treadle and to a stationary pin 1090 maintains the treadle in a normal, elevated position in engagement with a stop (not shown). A crank 1092 affixed to the shaft 1082 carries a pin 1094 which overlies a disc 1096 fast on a lower end portion of the valve controlling rod 484.

The pin 1094 is normally maintained at such a height that the rod 484 can go through its complete operating cycle without causing the disc 1096 to engage or be obstructed by the pin. By actuation of the treadle, however, the pin 1094 may be depressed to engage the disc 1096 and force it downward far enough to carry the rod 484 to its lower limit of movement. It is possible to effect this operation at any time, either while the operating parts of the machine are idle or at any point in the course of an operating cycle. When the rod is pulled downward with the motor running, the valve connections are thereby set to cause the oil under pressure to be delivered to the cylinders 38 for driving the ram 20 to its uppermost position.

When, after a shut down, the operator finds that the ram has drifted away from the uppermost position and should be returned to that position, he first closes the ram switch 660 and the motor 674. He then opens a conveniently accessible board circuit cutout switch 1098 (see also Figure 41) which has the effect of disabling all the circuits that could affect the solenoids 268 and 270. He next actuates the treadle 1080 to effect a return of the ram 20 to its uppermost position as described.

The reason for opening the switch 1098 in advance of the treadle operation is that the upward movement of the ram normally brings about a closing and opening of the switch 760. If the switch 760 were allowed to be temporarily closed during the upward movement just referred to, it would cause the solenoid 268 to be energized and would thereby bring about an unwanted operation of the cutting board to its inward or rear position.

It may be that the ram will be found displaced so short a distance from the normal position of rest that its return upward would not effect a closing of the switch 760. In that event the opening of the switch 1098 would be superfluous. In such a case, however, the opening of the switch 1098 does no harm, and the requirement for opening the switch in these circumstances is therefore established as a standard procedure. After the ram has been returned upward, the switch 1098 is again closed in preparation for the resumption of normal operation.

When the ram is reversed by operation of the treadle 1080 in the course of its downward movement, there is no time first to open the switch 1098. It is unnecessary to open the switch 1098, however, because the board is already in its inward or rear position. If the ascent of the ram induces a return of the board to the forward position, that is to be desired. If, however, the board is left in its rear position, it can be restored independently of the ram operation to the forward position by actuation of the handle 994 as has been described.

When the ram is stalled in the course of its descent, the requirements are similar to those just described. The treadle 1080 is first operated to cause the ram to be raised, and if the board is then found to have been left in its rear position, the handle 994 is operated to restore the board to its forward position.

The brake pulley or drum 248 (Figures 7 and 21), which is mounted on the shaft 80, is acted upon by a brake mechanism 1100 which is shown in detail in Figure 21. The purpose of the brake mechanism is to prevent overthrow of the shaft 80 and to avoid the familiar knocking tendency which commonly occurs in one revolution clutches. The brake mechanism 1100 comprises a pair of bands 1102 and 1104, the former of which includes an arm 1106 which is attached to a stationary bracket 1108 by a screw 1110. The bands are equipped with linings which bear in a groove 1112 formed in the drum 248. At one side of the drum, the bands 1102 and 1104 are connected through ears 1114. A screw 1116 is passed through one of the ears and threaded into the other. At the opposite side a headed screw 1118 is passed first through a compression coil spring 1120, then through an ear 1122 formed on the band 1104, and finally through the arm 1106. A nut 1124 threaded on the end of the screw 1118 holds the parts assembled and causes the spring 1120 to urge the band 1104 toward the band 1102 for applying a regulated braking pressure.

All of the mechanisms underneath the table in which heat is developed as an incident of operation are housed in an enclosure. The rear part of the enclosure is wider than the front. It is bounded by a rear plate 1126 which is secured to the rear ends of the side frame members 10 (Figure 5). Side plates 1128 extend over, and are attached to, the respective side frame members 10. Door members 1130 are hingedly mounted on the front ends of the side frame members 10. Each door member closes the space between one of the side frame members and adjacent side plate 54 of the narrow forward portion of the enclosure.

The forward end of the enclosure is covered by a removable, inclined front closure plate 1132. The side plates 54 are formed with inturned inclined flanges 1134 (Figure 16) which extend toward one another. Parallel bars 1136 and 1138 (see Figure 17 also) extend between the flanges 1134 and are attached permanently to them. The closure plate 1132 has upper and lower pairs of hooks 1140 attached to it for cooperation with the respective bars 1136 and 1138 so that the plate 1132 can be applied and removed conveniently.

The back plate 1126 and the front plate 1132 are provided with louvers 1142 and 1144 (see Figure 1 also), so that a circulation of air in the direction of the arrows in Figure 1 may be maintained through the enclosure by a fan 1146 which is provided on the motor shaft.

A plate 1148 forms an upper boundary for the motor containing portion of the enclosure, being supported upon handle bars 1150 which are secured to the side plates 54 by rivets 1152.

I have described what I believe to be the best embodiment of my invention. I do not wish, however, to be confined to the embodiment shown, but what I desire to cover by Letters Patent is set forth in the appended claims.

I claim:

1. In a hydraulic die press, in combination, a table for supporting a cutting board, a ram above the table, disaligned pairs of cylinders symmetrically disposed below the table at opposite sides thereof and midway between the ends thereof, each comprising an upper cylinder for driving the ram downward having a closed head at its upper end and an open lower end, and a lower cylinder for driving the ram upward having a closed head at its lower end and an open upper end, pistons in the cylinders having rods that extend out through the open ends of the cylinders in overlapping relation, the upper end of each lower piston rod terminating a considerable distance above the lower end of the associated upper piston rod, a rigid connector block at opposite sides of the machine joined to the upper ends of the respective lower piston rods at a comparatively high level and to the lower ends of the upper piston rods, yokes embracing the lower piston rods and forming the means of connection between the upper end of each such piston rod and its associated massive block, each block extending equally to the front and rear of the associated piston rods, and parallel rigid members operatively connecting each block to the ram.

2. In a hydraulic die press, in combination, a table for supporting a cutting board, a ram above the table, upper and lower cylinders below the table at opposite sides thereof, the upper cylinders for driving the ram downward and the lower cylinders for driving the ram upward, pistons in the cylinders having rigid connecting rods extending from them, massive connecting blocks disposed to extend fore and aft beneath the table at opposite sides of the machine and each rigidly connected to the connecting rods at its own side of the machine, front and rear corner rods at opposite sides of the machine, rigidly connected to the respective associated connecting blocks and to the ram, and corner sleeves carried by the table for guiding the corner rods.

3. In a hydraulic die press, in combination, a table for supporting a cutting board, a ram above the table, upper and lower cylinders below the table at opposite sides thereof, the upper cylinders for driving the ram downward and the lower cylinders for driving the ram upward, pistons in the cylinders having rigid connecting rods extending from them, massive connecting blocks disposed to extend fore and aft beneath the table at opposite sides of the machine and each rigidly connected to the connecting rods at its own side of the machine, front and rear corner rods at opposite sides of the machine, rigidly connected to the respective connecting blocks and to the ram, parallel guides for the corner rods, and front and rear transverse equalizers comprising front and rear transverse equalizer shafts, gearing connected between the front corner rods and opposite ends of the front shaft for compelling the front corner rods to travel in unison, and gearing between the rear corner rods and the opposite ends of the rear shaft for compelling the rear corner rods to travel in unison.

4. In a hydraulic die press, in combination, a table for supporting a cutting board, a ram above the table, upper and lower cylinders below the table at each side of the table, the upper cylinders for driving the ram down and the lower cylinders for driving the ram up, the upper cylinders having closed heads at their upper ends and being open at their lower ends, and the lower cylinders having closed heads at their lower ends and being open at their upper ends, pistons in the cylinders having rods that extend out through the open ends of the cylinders, the upper ends of the lower piston rods terminating a considerable distance above the lower ends of the upper piston rods, massive connecting blocks disposed to extend fore and aft beneath the table at opposite sides of the press, and each rigidly connected to the ends of the connecting rods at its own side of the press, front and rear corner rods at opposite sides of the machine connecting the connecting blocks and the ram, and corner sleeves receiving and guiding corner rods.

5. In a hydraulic die press, in combination, a table for supporting a cutting board, a ram above the table, upper and lower cylinders below the table at each side of the table, the upper cylinders for driving the ram down and the lower cylinders for driving the ram up, the upper cylinders having closed heads at their upper ends and being open at their lower ends, and the lower cylinders having closed heads at their lower ends and being open at their upper ends, pistons in the cylinders having rods that extend out through the open ends of the cylinders, the upper ends of the lower piston rods terminating a considerable distance above the lower ends of the upper piston rods, massive connecting blocks disposed to extend fore and aft beneath the table at opposite sides of the press, and each rigidly connected to the ends of the connecting rods at its own side of the press, front and rear corner rods at opposite sides of the press connecting the connecting blocks and the ram, parallel guides for the corner rods, and front and rear equalizers comprising front and rear transverse equalizing shafts, gearing between the front corner rods and opposite ends of the front shaft for compelling the front corner rods to travel in unison, and gearing between the rear corner rods and opposite ends of the rear shaft for compelling the rear corner rods to travel in unison.

6. In a hydraulic die press, in combination, a table for supporting a cutting board, a ram above the table, front and rear corner rods connected rigidly to the ram at the right side and at the left side thereof, hydraulic mechanisms at the right and left sides beneath the table and connected to the right and left sides of the ram, respectively, for driving the ram through said corner rods, rigid connectors extending fore and aft beneath the table at the right and left sides of the machine for rigidly interconnecting the right corner rods and the left corner rods, respectively, and front and rear equalizer gearings beneath the table interconnecting the front corner rods and the rear corner rods, respectively, the former for compelling the front corner rods to travel in unison and the latter for compelling the rear corner rods to travel in unison.

7. In a hydraulic die press, in combination, a table for supporting a cutting board, a ram above the table, vertically disposed hydraulic cylinders below the table at opposite ends of the ram comprising upper cylinders for driving the ram downward and lower cylinders for driving the ram upward, pistons operating in the cylinders, operating connections from the pistons to corresponding ends of the ram, and ram equalizer gearing for compelling widely separated portions of the ram to move in unison, said ram, operating connections, equalizing mechanism and cylinders being supported entirely from the table, the arrangement being such that all of the ram operating and driving forces are sustained by the table, and particularly that the downward pressure of the ram against the table is balanced by the upward thrust of the upper cylinders against the lower side of the table.

8. In a hydraulic die press, in combination, a table for supporting a cutting board, a ram above the table, front and rear corner rods connected respectively to the ram at the right side and at the left side thereof, corner guide sleeves open at their upper and lower ends for receiving and guiding the respective rods, hydraulic mechanism beneath the table for driving the ram through the medium of said corner rods, front and rear equalizer gearings beneath the table interconnecting the front corner rods and the rear corner rods, respectively, each of said gearings comprising a transverse shaft having gears unitary with its opposite ends, and racks adjacent parallel to the respective associated corner rods each spaced slightly from the associated rods and connected to move in unison with it, each rack being rigidly connected with the associated rod below the lower end of the associated sleeve and disposed to extend upward alongside such sleeve, and a channeled rack guide secured below the table on each sleeve to sustain the rack unyieldingly against lateral pressure of the associated gear.

9. A die press comprising, in combination, a cutting board support, a ram operable toward and from said support, a cutting board reciprocable along said support, and a lengthwise reciprocable driving tongue for the cutting board, and a novel operating connector for joining the cutting board to the tongue in different locations longitudinally of the tongue in order to alter the range of movement of the cutting board while maintaining the length of stroke of the cutting board unaltered, said connector including a block connected in fixed relation to the cutting board, a pair of plunger pins on the block having lower end portions which are out of alignment with one another longitudinally of the block, the tongue having a pair of pin receiving openings in longitudinal alignment with the respective pins but located at points which are separated lengthwise of the tongue by a distance substantially equal to the operating stroke of the tongue, and a cam slide mounted for movement transversely of the block and having oppositely sloped upper faces, the plunger pins including elements which overlie the respective cam faces so that one pin may be withdrawn from the tongue as the other is freed for projection toward and into the tongue.

10. A die press comprising, in combination, a cutting board support, a ram operable toward and from said support, a cutting board reciprocable along said support, and a driving lengthwise reciprocable tongue for the cutting board, and a novel connector for joining the cutting board to the tongue in different locations longitudinally of the tongue in order to alter the range of movement of the cutting board while maintaining the length of stroke of the cutting board unaltered, said connector including a block connected in fixed relation to the cutting board, a pair of plunger pins on the block having lower end portions which are out of alignment with one another longitudinally of the block, the tongue having a pair of pin receiving openings in longitudinal alignment with the respective pins but located at points which are separated lengthwise of the tongue by a distance substantially equal to the operating stroke of the tongue, a cam slide mounted for movement transversely of the block and having oppositely sloped upper faces, the plunger pins including elements which overlie the respective cam faces so that one pin may be withdrawn from the tongue as the other is freed for projection toward and into the tongue, and means for yieldingly detaining the cam slide in different positions of adjustment.

11. In a die press comprising a table, a ram above the table, reciprocable toward and from the table through different selected ranges of movement, a cutting board mounted on the table for carrying a sheet stack to and from a cutting position beneath the ram, and control mechanism for the cutting board which includes a switch required to be closed once in each operating cycle in response to upward movement of the ram for initiating outward movement of the cutting board, the combination with the ram of a ram equalizer gearing including a shaft connected to be moved back and forth in uniform relation to the up and down movements of the ram, a cam, frictional driving means for operating the cam from the shaft, first in one direction and then in the other, stop means for limiting the cam to a predetermined angular range of movement less than that through which the shaft is driven by the minimum ram stroke, so that, in either direction, the cam first turns in unison with the shaft and then stands idle while the shaft completes its movement, and a follower cooperative with the cam, the follower and cam being constructed and arranged to pass one another idly as the ram moves down but to close the board controlling switch referred to in an early portion of the upward movement of the ram.

12. In a die press comprising a table, a ram above the table, reciprocable to and from the table through different selected ranges of movement, a cutting board mounted on the table for carrying a sheet stack to and from a cutting position beneath the ram, and control mechanism for the cutting board which includes a switch required to be closed once in each operating cycle in response to upward movement of the ram for initiating outward movement of the cutting board, the combination with the ram of a shaft connected to be turned back and forth in uniform relation to the up and down movements of the ram, a switch actuating mechanism including members constructed and arranged to pass one another idly as the ram moves down but to close the control switch referred to as the ram moves up, one of said members being mounted on the aforesaid shaft, frictional driving means driving the shaft mounted member from the shaft, and stop means for prescribing the range of movement of said member to cause it to travel in the same range and in the same timed relation to the upward movement of the ram, regardless of variations in the limits and extent of ram movement.

13. In a die press comprising a table, a ram above the table, reciprocable to and from the table through different selected ranges of movement, a cutting board mounted on the table for carrying a sheet stack to and from a cutting position beneath the ram, and control mechanism for the cutting board which includes a switch required to be closed once in each operating cycle in response to upward movement of the ram for initiating outward movement of the cutting board, a shaft connected to be turned back and forth in uniform relation to the up and down movements of the ram, a switch actuating mechanism comprising a cam driven from the shaft and a follower cooperative with the cam, an arm supporting the follower, a switch actuating shaft carrying the arm, means supporting the arm from the switch actuating shaft with freedom for rocking movement into and out of a plane at right angles to the switch actuating shaft, and means for yieldingly urging the arm toward said plane from opposite directions, the cam being constructed to push the follower aside and pass it idly as the ram moves down, but to actuate the follower to effect a switch closing operation as the ram moves up.

References Cited in the file of this patent

UNITED STATES PATENTS

| 617,913 | Stevens | Jan. 17, 1899 |
| 796,523 | Morse | Aug. 8, 1905 |
| 897,048 | Astfalck | Aug. 25, 1908 |
| 907,690 | Harbeck | Dec. 22, 1908 |
| 1,270,913 | Wright | July 2, 1918 |
| 1,469,689 | Prius | Oct. 2, 1923 |
| 2,052,256 | Shoults | Aug. 25, 1936 |
| 2,085,799 | Glasner | July 6, 1937 |
| 2,121,716 | Shields | June 21, 1938 |
| 2,131,153 | Stone | Sept. 27, 1938 |
| 2,176,543 | Norton | Oct. 17, 1939 |
| 2,185,551 | Glasner et al. | Jan. 2, 1940 |
| 2,259,320 | Novick et al. | Oct. 14, 1941 |
| 2,343,073 | Morin | Feb. 29, 1944 |
| 2,403,020 | Parsons | July 2, 1946 |
| 2,426,108 | Loewe | Aug. 19, 1947 |
| 2,481,862 | Muller et al. | Sept. 13, 1949 |
| 2,502,072 | Bender | Mar. 28, 1950 |
| 2,555,426 | Trautman et al. | June 5, 1951 |
| 2,556,719 | Cushman | June 12, 1951 |

FOREIGN PATENTS

| 461,398 | Germany | June 19, 1928 |